(12) United States Patent
Bulusu et al.

(10) Patent No.: US 12,309,295 B2
(45) Date of Patent: May 20, 2025

(54) CLOUD-BASED MAN-IN-THE-MIDDLE INSPECTION OF ENCRYPTED TRAFFIC USING CLOUD-BASED MULTI-TENANT HSM INFRASTRUCTURE

(71) Applicant: Zscaler, Inc., San Jose, CA (US)

(72) Inventors: Vijay Bulusu, Fremont, CA (US); Akshat Maheshwari, Bangalore (IN); Harpreet Singh, San Jose, CA (US); Sujay Kumar, Bangalore (IN); Lidor Pergament, San Mateo, CA (US); Srikanth Devarajan, Cupertino, CA (US)

(73) Assignee: Zscaler, Inc., San Jose, CA (US)

( * ) Notice: Subject to any disclaimer, the term of this patent is extended or adjusted under 35 U.S.C. 154(b) by 488 days.

(21) Appl. No.: 17/843,095

(22) Filed: Jun. 17, 2022

(65) Prior Publication Data

US 2022/0329442 A1    Oct. 13, 2022

Related U.S. Application Data

(63) Continuation-in-part of application No. 17/715,137, filed on Apr. 7, 2022, now Pat. No. 11,750,405, which is a continuation of application No. 16/863,475, filed on Apr. 30, 2020, now Pat. No. 11,394,563.

(51) Int. Cl.
*H04L 9/32* (2006.01)
*H04L 9/40* (2022.01)

(52) U.S. Cl.
CPC ........ *H04L 9/3263* (2013.01); *H04L 63/0428* (2013.01); *H04L 63/1416* (2013.01)

(58) Field of Classification Search
None
See application file for complete search history.

(56) References Cited

U.S. PATENT DOCUMENTS

| 9,602,291 B2 | 3/2017 | Ashley et al. |
| 2003/0028606 A1 | 2/2003 | Koopmans et al. |
| 2003/0053448 A1 | 3/2003 | Craig et al. |

(Continued)

FOREIGN PATENT DOCUMENTS

EP        3 905 629 A1    11/2021

OTHER PUBLICATIONS

K. Walsh, "TLS with Trustworthy Certificate Authorities," 2016 IEEE Conference on Communication and Network Security (CNS), IEEE, Oct. 17, 2016, pp. 516-524.

(Continued)

*Primary Examiner* — Brandon Hoffman
(74) *Attorney, Agent, or Firm* — Baratta Law PLLC; Lawrence A. Baratta, Jr.

(57) ABSTRACT

A method implemented by a node in a cloud-based system includes responsive to monitoring a user device, detecting a request for encrypted traffic to a domain from the user device; checking if a domain certificate for the domain is available in cache; responsive to the domain certificate being in the cache, creating a first tunnel to the domain and a second tunnel to the user device; and, responsive to the domain certificate not being in the cache, generating the domain certificate with a cloud hardware security module (HSM) system, and creating the first tunnel and the second tunnel.

20 Claims, 20 Drawing Sheets

(56) References Cited

U.S. PATENT DOCUMENTS

| | | |
|---|---|---|
| 2004/0210674 A1 | 10/2004 | Gbadegesin |
| 2005/0144328 A1 | 6/2005 | McBeath |
| 2006/0031407 A1 | 2/2006 | Dispensa et al. |
| 2010/0024026 A1 | 1/2010 | Yionen |
| 2010/0318665 A1 | 12/2010 | Demmer et al. |
| 2014/0325087 A1 | 10/2014 | Barreto et al. |
| 2015/0143504 A1 | 5/2015 | Desai et al. |
| 2016/0149898 A1 | 5/2016 | Parla et al. |
| 2016/0234104 A1 | 8/2016 | Hoffmann |
| 2016/0248812 A1 | 8/2016 | Desai et al. |
| 2017/0064749 A1 | 3/2017 | Jain et al. |
| 2017/0078328 A1 | 3/2017 | McGinnity et al. |
| 2017/0142068 A1 | 5/2017 | Devarajan et al. |
| 2017/0325113 A1 | 11/2017 | Markopoulou et al. |
| 2017/0346853 A1 | 11/2017 | Wyatt et al. |
| 2018/0063077 A1 | 3/2018 | Tumuluru |
| 2018/0181431 A1 | 6/2018 | Vincent et al. |
| 2018/0288062 A1 | 10/2018 | Goyal et al. |
| 2019/0238592 A1 | 8/2019 | Qureshi et al. |
| 2019/0386814 A1* | 12/2019 | Ahmed .................. H04L 9/008 |
| 2020/0092264 A1 | 3/2020 | Rahkonen et al. |
| 2020/0236093 A1 | 7/2020 | Bannister et al. |
| 2021/0344511 A1* | 11/2021 | Devarajan ........... H04L 63/0281 |

OTHER PUBLICATIONS

Oct. 18, 2023, Extended European Search Report for EP Application No. 23153577.4.

* cited by examiner

CLOUD-BASED MAN-IN-THE-MIDDLE INSPECTION OF ENCRYPTED TRAFFIC USING CLOUD-BASED MULTI-TENANT HSM INFRASTRUCTURE

CROSS-REFERENCE TO RELATED APPLICATION(S)

The present disclosure is a continuation-in-part of U.S. Patent Application No. 17/715,137, filed Apr. 7, 2022, and entitled "Encrypted traffic inspection in a cloud-based security system," which is now U.S. Pat. No. 11,750,402. issued Sep. 5, 2023, and which is a continuation of U.S. patent application Ser. No. 16/863,475, filed Apr. 30, 2020, and entitled "Encrypted traffic inspection in a cloud-based security system," which is now U.S. Pat. No. 11,384,563, issued Jul. 19, 2022. the contents of each are incorporated by reference in their entirety.

FIELD OF THE DISCLOSURE

The present disclosure relates generally to networking and computing. More particularly, the present disclosure relates to systems and methods for cloud-based hardware security modules (HSM) with multi-tenant key infrastructure for man-in-the-middle inspection of encrypted traffic.

BACKGROUND OF THE DISCLOSURE

There is a significant amount of encrypted traffic on the Internet. For example, protocols such as SSL, TLS, DTLS, HTTPS, etc. are used to provide privacy and data integrity. According to some forecasts, 70% or more of all Web traffic now uses SSL, and these numbers are growing. Encrypted traffic presents a security hole, i.e., a blind spot. Enterprises conventionally have deployed appliances and other devices at the network perimeter to perform security functions. In terms of encrypted traffic, the appliances need to break the encryption in order to monitor the traffic. This is resource intense, and conventional appliances simply do not scale. As such, most enterprises simply forego the inspection of encrypted traffic. Other studies have shown that the majority of malware today is hidden in encrypted traffic. Also, encrypted traffic presents a problem in terms of Data Loss Prevention (DLP) because sensitive data is typically concealed in SSL/TLS traffic, which is difficult and expensive to inspect (in terms of cost, processing capability, and latency). Without visibility and control, organizations are at an increased risk of data loss, due either to unintentional or malicious reasons. The conventional appliance and network perimeter security approach is breaking down with the mobility of users, the processing capability of user devices, etc. As such, security is moving to the cloud, namely as a service offered through a cloud-based system.

A hardware security module (HSM) is a physical computing device that safeguards and manages digital keys, performs encryption and decryption functions for digital signatures, strong authentication and other cryptographic functions. These modules traditionally come in the form of a plug-in card or an external device that attaches directly to a computer or network server. A hardware security module contains one or more secure cryptoprocessor chips There are various use cases for an HSM such as a central authority (CA), payments, secure tunnel establishment, cryptocurrency, etc.

In an example application, most large and major enterprises prefer to bring their own intermediate CA to a cloud-based security system in order to perform man-in-the-middle (MITM) based transport layer security (TLS) inspection. In this model, the cloud-based security system essentially acts as an external, to the enterprise "boundary," intermediate CA of the enterprise public key infrastructure (PKI) and generates/stores an intermediate CA private key in the cloud boundary on disk (e.g., structured query language (SQL) database (DB)). Disadvantageously, storing private keys for a customer on a SQL DB without hardware protection leaves them prone to be exploited and exposed. Whether the exposure is driven by a malicious intruder, malicious insider/operator or even unintentional, the consequence is that an adversary who controls the key can sign TLS certificates for malicious destinations (e.g., credential stealing sites) on behalf of the customer, which would be blindly trusted by every user that is configured to their root CA. For large organizations and financial service providers in particular, this risk is unacceptable and makes them out of compliant with PKI governance policies that mandate that any certificate private key issued from an Enterprise PKI (Root or iCA) that has the power to issue subordinate certificates of any kind must be generated in and persist its entire lifetime in a FIPS 140-2 Level 3 HSM.

BRIEF SUMMARY OF THE DISCLOSURE

The present disclosure relates to systems and methods for man-in-the-middle inspection of encrypted traffic using cloud-based hardware security modules (HSM) with multi-tenant key infrastructure. Of note, any certificate private key issued from an Enterprise PKI (Root or iCA) that has the power to issue subordinate certificates of any kind must be generated in and persist for its entire lifetime in a FIPS 140-2 Level 3 HSM. The Federal Information Processing Standard Publication 140-2, (FIPS PUB 140-2), the contents of which are incorporated by reference herein, is a U.S. government computer security standard used to approve cryptographic modules. The title is Security Requirements for Cryptographic Modules. Initial publication was on May 25, 2001, and was last updated Dec. 3, 2002.

Also, the present disclosure relates to systems and methods for encrypted traffic inspection in a cloud-based security system, such as Secure Sockets Layer (SSL), Transport Layer Security (TLS), Hypertext Transfer Protocol Secure (HTTPS), and the like. The cloud-based security system is configured to monitor users in an inline manner as a proxy or Secure Web or Internet Gateway, including monitoring encrypted traffic, e.g., Secure Sockets Layer (SSL)/Transport Layer Security (TLS) traffic. Based on this proxy by the design aspect of the cloud-based security system, the cloud-based security system can provide inspection on encrypted traffic, such as SSL, TLS, DTLS, HTTPS, etc., without the inspection limitations of appliances. Various approaches are contemplated, including a snooping approach, a Man-in-the-Middle (MitM) proxy approach, and the like. The snooping approach includes snooping session keys and utilizing the snooped keys to non-intrusively monitor the encrypted traffic. Advantageously, this approach does not terminate the encrypted traffic. The MitM proxy approach has a cloud node that sits as a proxy between a user device and an endpoint where the proxy breaks the encrypted traffic in the middle. With the inspection of encrypted traffic, the cloud-based security system can perform a full suite of security functions on the traffic.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 3 is a block diagram of a server that may be used in the cloud-based system of FIGS. 1 and 2 or the like.

FIG. 4 is a block diagram of a user device that may be used with the cloud-based system of FIGS. 1 and 2 or the like.

DETAILED DESCRIPTION OF THE DISCLOSURE

Again, the present disclosure relates to systems and methods for man-in-the-middle inspection of encrypted traffic with cloud-based hardware security modules (HSM) with multi-tenant key infrastructure. Of note, any certificate private key issued from an Enterprise PKI (Root or iCA) that has the power to issue subordinate certificates of any kind must be generated in and persist for its entire lifetime in a FIPS 140-2 Level 3 HSM. The Federal Information Processing Standard Publication 140-2, (FIPS PUB 140-2), the contents of which are incorporated by reference herein, is a U.S. government computer security standard used to approve cryptographic modules. The title is Security Requirements for Cryptographic Modules. Initial publication was on May 25, 2001, and was last updated Dec. 3, 2002.

§ 1.0 Example Cloud-Based System Architecture

Figure 1:
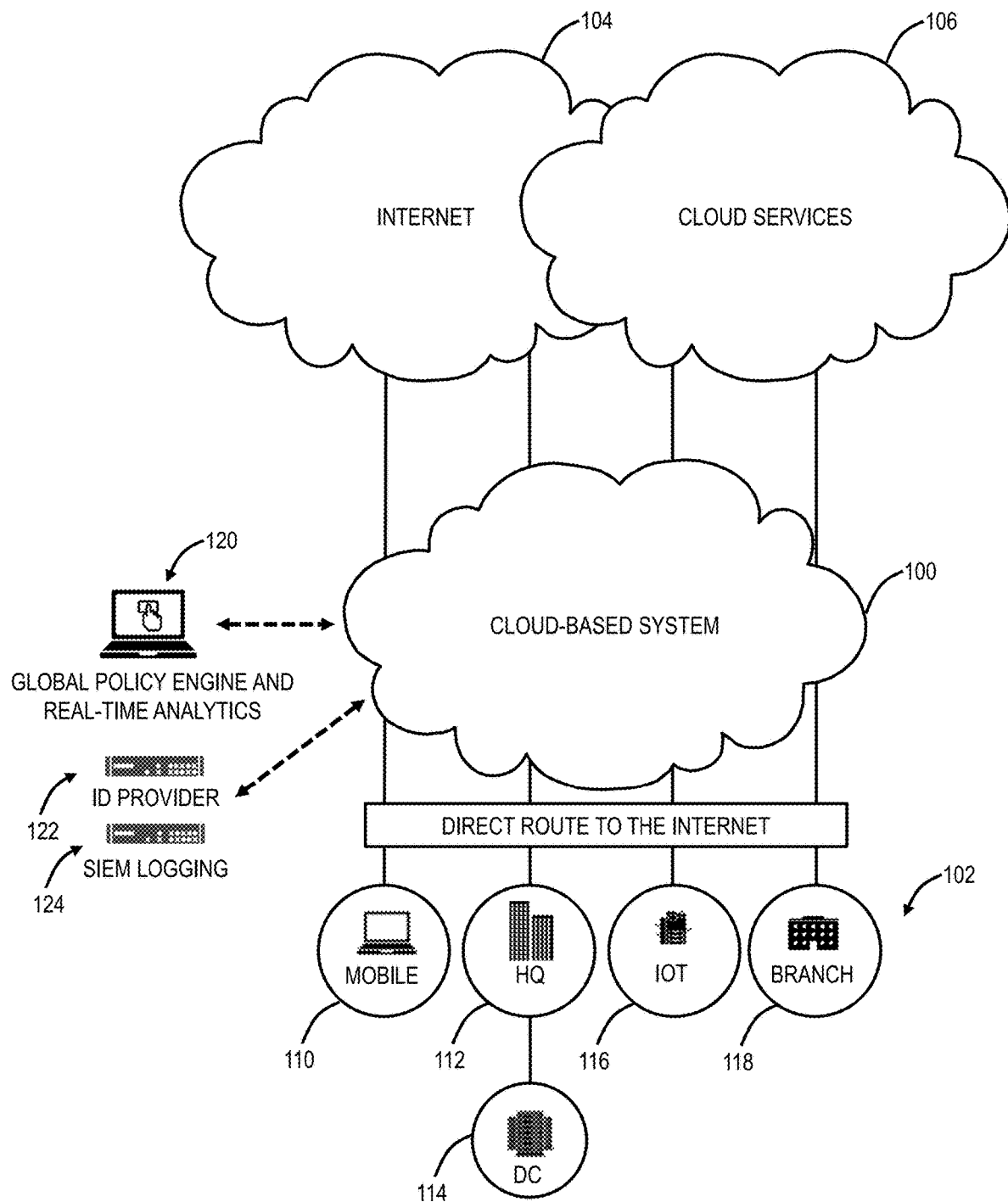
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including secure sockets layer (SSL) traffic. The cloud-based system 100 can offer access control, threat prevention, data protection, etc. The access control can include a cloud-based firewall, cloud-based intrusion detection, uniform resource locator (URL) filtering, bandwidth control, domain name system (DNS) filtering, etc. Threat prevention can include cloud-based intrusion prevention, protection against advanced threats (malware, spam, cross-site scripting (XSS), phishing, etc.), cloud-based sandbox, antivirus, DNS security, etc. The data protection can include data loss prevention (DLP), cloud application security such as via a cloud access security broker (CASB), file type control, etc.

The cloud-based firewall can provide deep packet inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

The cloud-based system 100 can provide other security functions, including, for example, micro-segmentation, workload segmentation, API security, cloud security posture management (CSPM), user identity management, and the like. That is, the cloud-based system 100 provides a network architecture that enables delivery of any cloud-based security service, including emerging frameworks.

Figure 5:
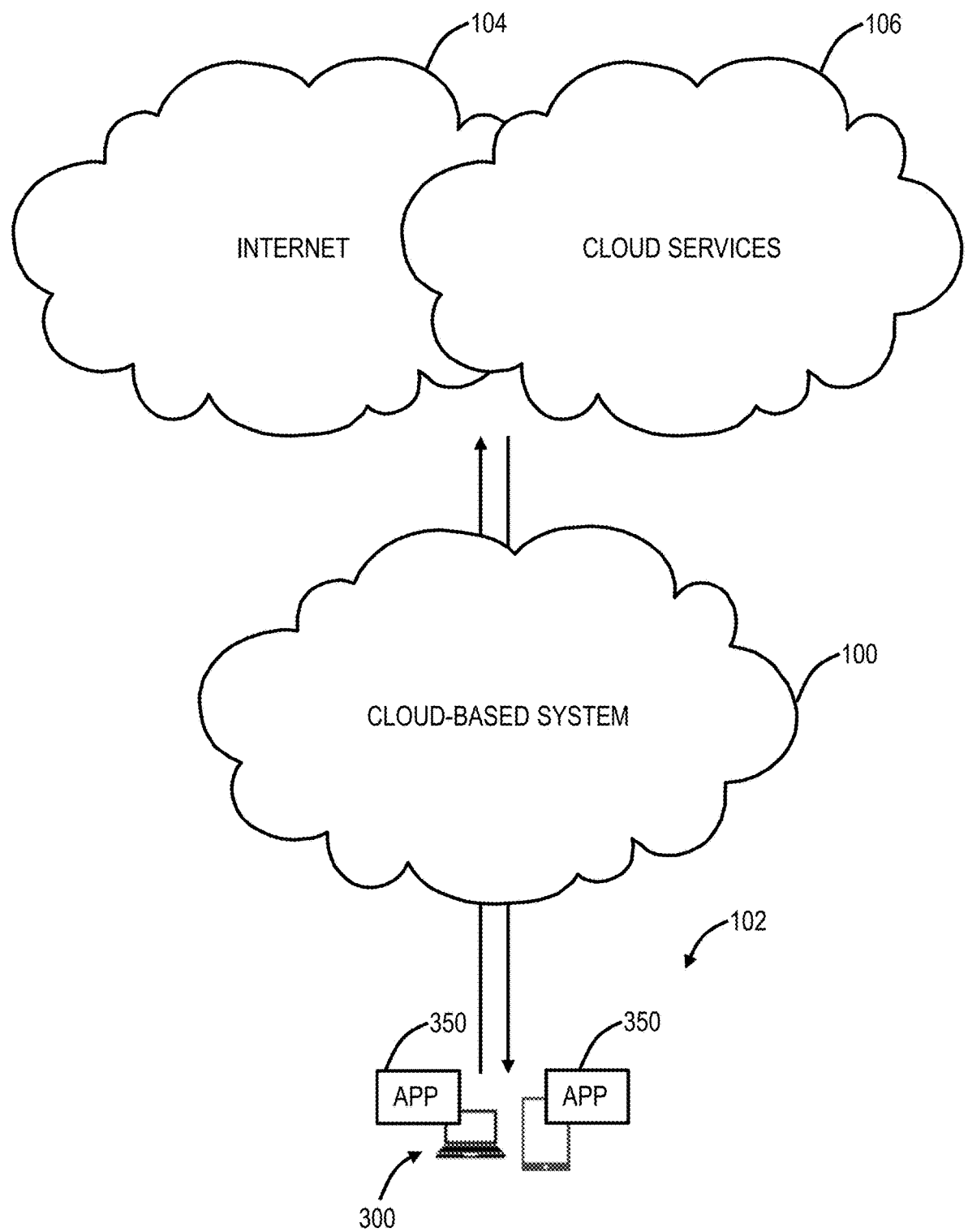
FIG. 5 is a network diagram of the cloud-based system illustrating an application on user devices with users configured to operate through the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 (user equipment (UE)) is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via virtual private networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as GRE, L2TP, IPsec, customized tunneling protocols, etc. The devices 110, 116, when not at one of the locations 112, 114, 118 can use a local application that forwards traffic, a proxy such as via a proxy auto-config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an identity provider (IDP) 122 for authentication of the users 102 and to a security information and event management (SIEM) system 124 for event logging. The system 124 can provide alert and activity logs on a per-user 102 basis.

Figure 2:
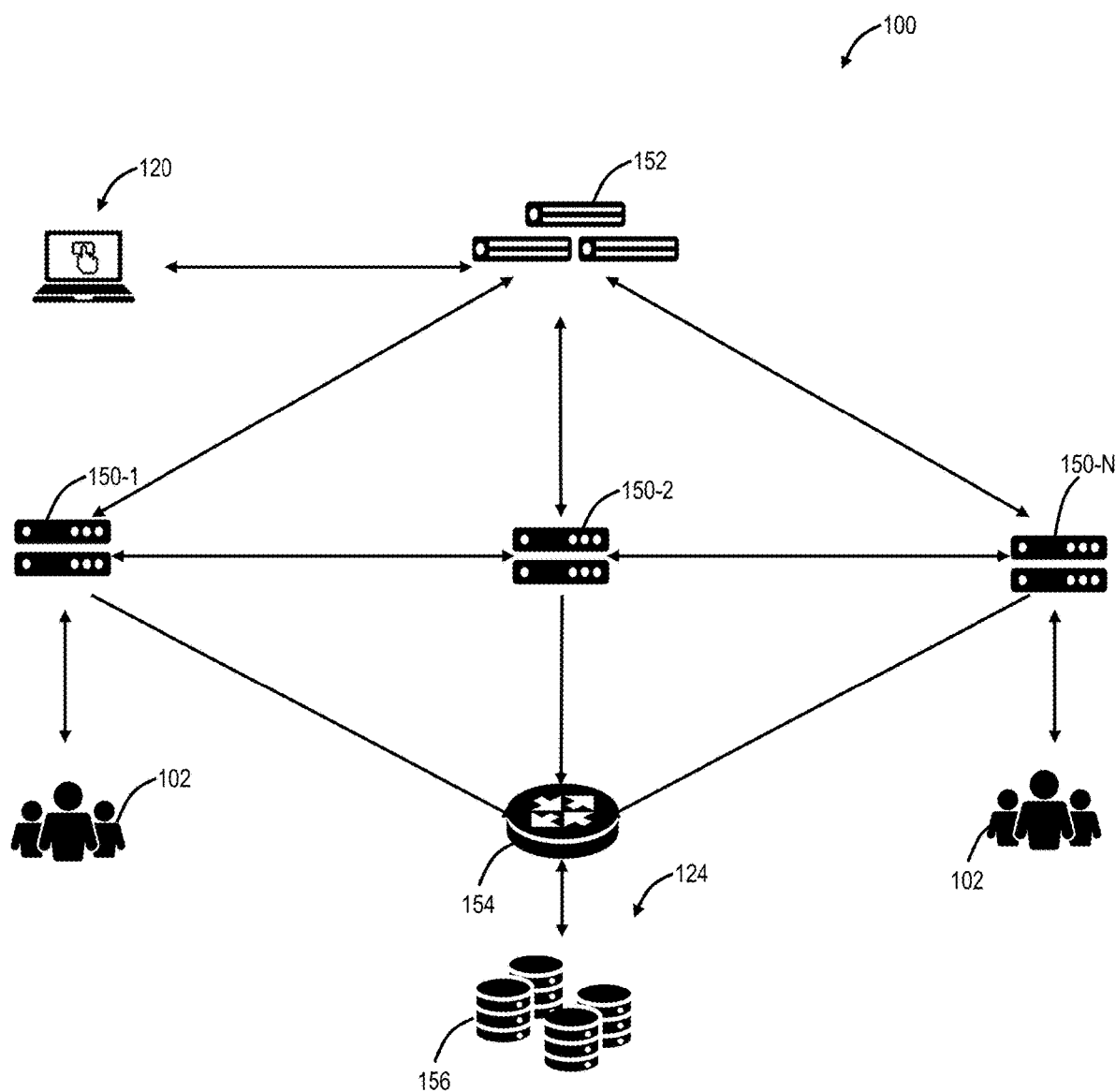
FIG. 2 is a network diagram of an example implementation of the cloud-based system.
Figure 4:
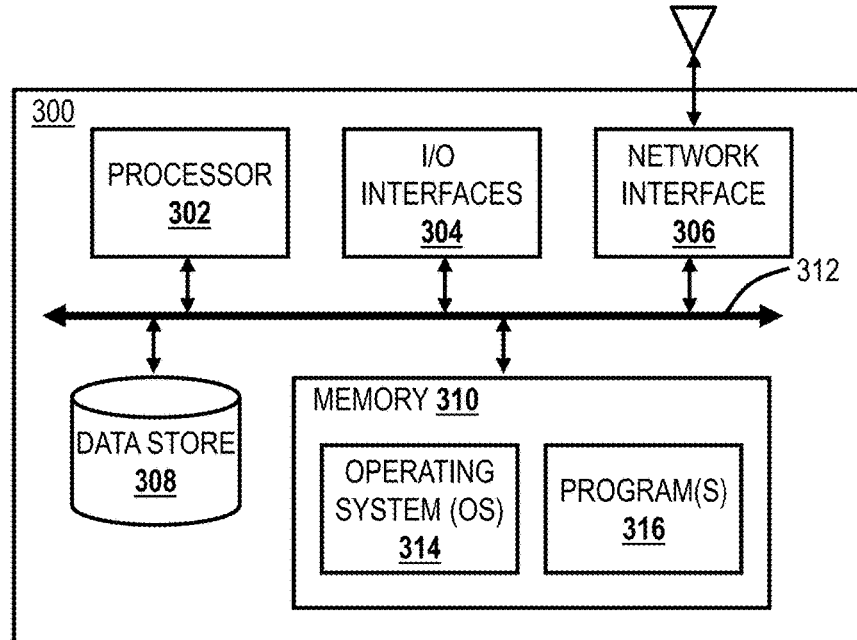

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. Note, the nodes 150 are called "enforcement" nodes 150 but they can be simply referred to as nodes 150 in the cloud-based system 100. Also, the nodes 150 can be referred to as service edges. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from the tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure transport layer security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement nodes 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional virtual private networks (VPNs), namely ZPA provides zero trust network access (ZTNA). Those of ordinary skill in the art will recognize various other types of cloud services 106 are also contemplated. Also, other types of cloud architectures are also contemplated, with the cloud-based system 100 presented for illustration purposes.

§ 1.1 Private Nodes Hosted by Tenants or Service Providers

The nodes 150 that service multi-tenant users 102 may be located in data centers. These nodes 150 can be referred to as public nodes 150 or public service edges. In embodiment, the nodes 150 can be located on-premises with tenants (enterprise) as well as service providers. These nodes can be referred to as private nodes 150 or private service edges. In operation, these private nodes 150 can perform the same functions as the public nodes 150, can communicate with the central authority 152, and the like. In fact, the private nodes 150 can be considered in the same cloud-based system 100 as the public nodes 150, except located on-premises. When a private node 150 is located in an enterprise network, the private node 150 can have a single tenant corresponding to the enterprise; of course, the cloud-based system 100 is still multi-tenant, but these particular nodes are serving only a single tenant. When a private node 150 is located in a service provider's network, the private node 150 can be multi-tenant for customers of the service provider. Those skilled in the art will recognize various architectural approaches are contemplated. The cloud-based system 100 is a logical construct providing a security service.

§ 2.0 User Device Application for Traffic Forwarding and Monitoring

Figure 3:
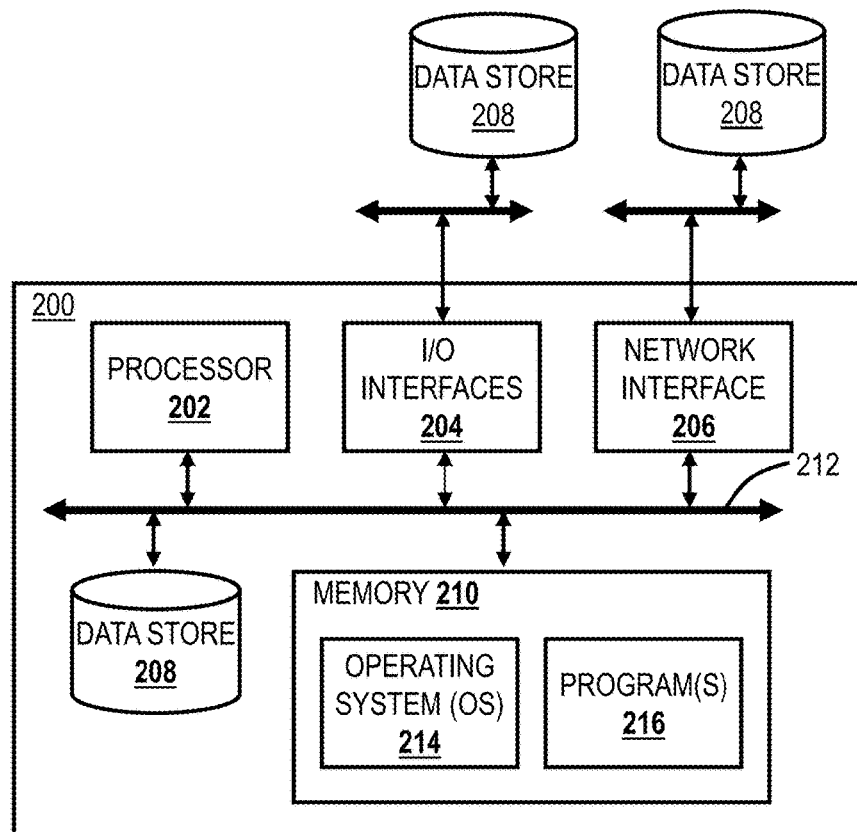

FIG. 3 is a network diagram of the cloud-based system 100 illustrating an application 350 on user devices 300 with users 102 configured to operate through the cloud-based system 100. Different types of user devices 300 are proliferating, including bring your own device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best-in-class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support mobile device management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

§ 3.0 Example Server Architecture

FIG. 4 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

§ 4.0 Example User Device Architecture

FIG. 5 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

§ 5.0 Zero Trust Network Access Using the Cloud-Based System

Figure 6:
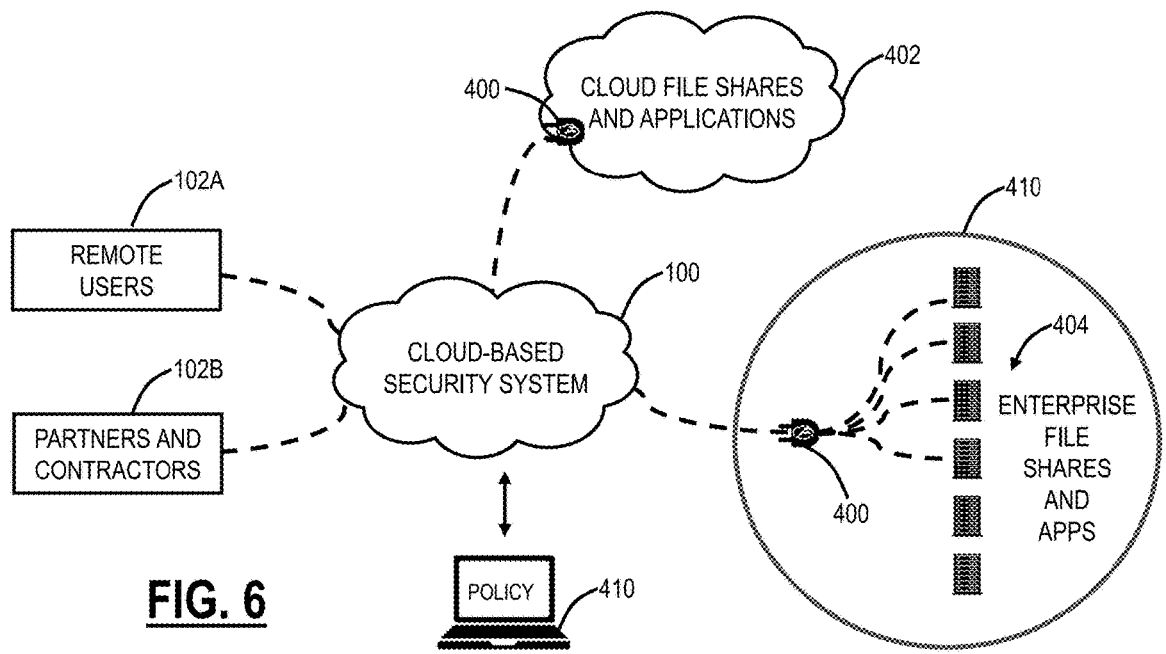
FIG. 6 is a network diagram of a Zero Trust Network Access (ZTNA) application utilizing the cloud-based system of FIGS. 1 and 2.

FIG. 6 is a network diagram of a zero-trust network access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300. Also, the applications 402, 404 can include B2B applications. Note, the difference between the applications 402, 404 is the applications 402 are hosted in the cloud, whereas the applications 404 are hosted on the enterprise network 410. The B2B service described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

§ 6.0 Digital Experience Monitoring

Figure 7:
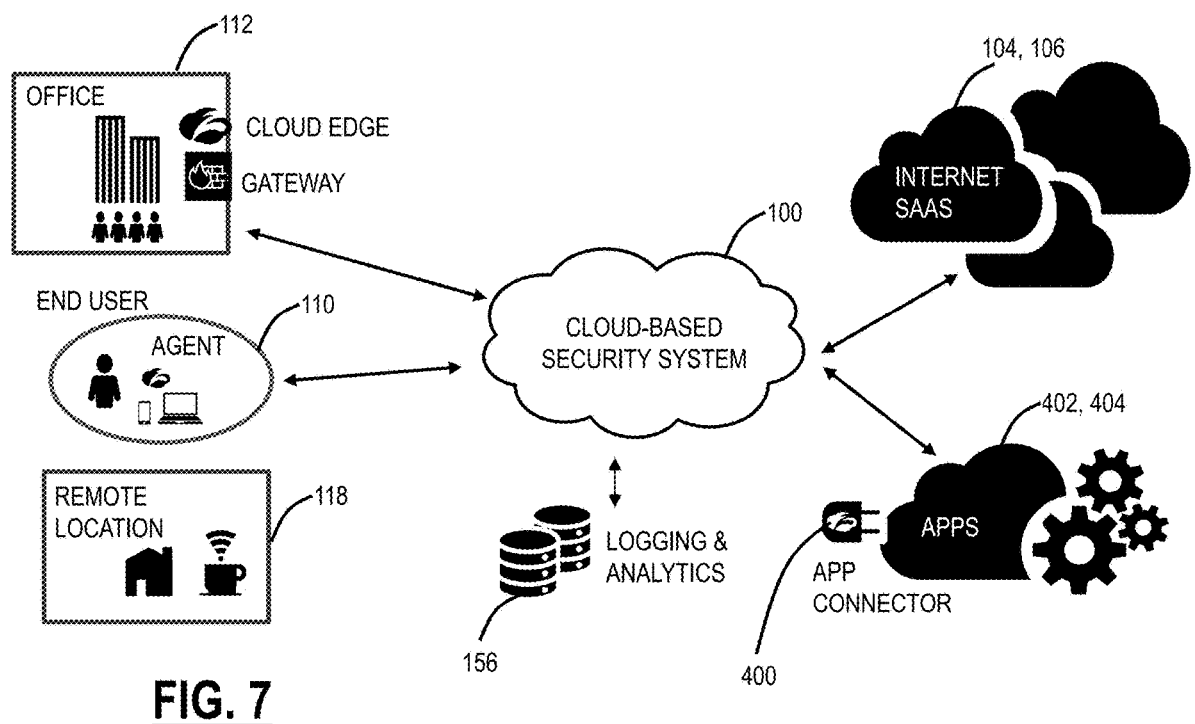
FIG. 7 is a network diagram of the cloud-based system of FIGS. 1 and 2 in an application of digital experience monitoring.

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., domain name system (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| System details | Network (config) |
|---|---|
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an in-line transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

§ 7.0 SSL Overview

Figure 8:
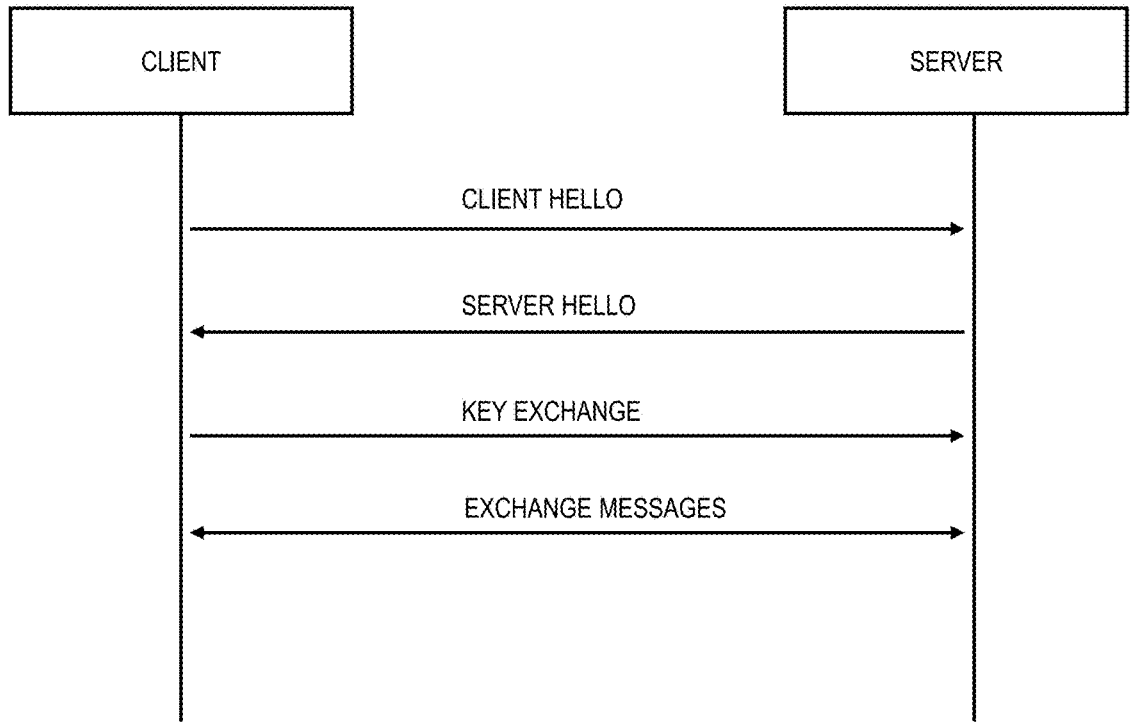
FIG. 8 is a flow diagram illustrating an example handshake for HTTPS to describe a secure, encrypted tunnel between a client (e.g., the user device of FIG. 4) and a server (e.g., the server of FIG. 3).

Secure Sockets Layer (SSL) is a client-server protocol that creates a secure channel over the Internet. SSL is used to validate the identity of the destination server and (optionally) the client, and to encrypt information sent across the internet between the client and server. FIG. 8 is a flow diagram illustrating an example handshake for HTTPS to describe a secure, encrypted tunnel between a client (e.g., the user device 300) and a server (e.g., the server 200). When a client, such as a browser, first sends an HTTPS request to a server, it starts a series of message exchanges called the SSL handshake. The client can send an HTTPS request with supported cipher suites and compression algorithms, session ID, SSL version, and a randomly generated value, i.e., a "client hello."

The server sends its digital certificate to the client to authenticate itself, as well as the selected cipher suite and compression algorithm, session ID, SSL session, a randomly generated value, a certificate with a public key, and optionally a request for the client's certificate, i.e., a "server hello." The client verifies the certificate with a Certificate Authority (CA), sends the pre-master secret computed with both random values, and encrypted with the server's public key. The client notifies the server that all subsequent messages will be encrypted with the keys and negotiated algorithms, i.e., the client and server agree on the SSL protocol version and algorithms to use, and the client and server generate the symmetric keys they will use to encrypt their messages.

The server uses its private key to decrypt the pre-master key, only the server with the private key that matches the public key that was sent with the certificate can decrypt the pre-master key. The server validates the browser (client) certificate and uses the public key to decrypt the messages. The server notifies the client that all subsequent messages will be encrypted using the keys and negotiated algorithms. The server computes the master key from the pre-master key and generates the session key. The server sends a message that is a hash of the exchanged messages using the master key and the session key. The client decrypts the message and validates the hash, leading to a successful handshake.

After the SSL handshake is successfully completed, the client and server continue with the standard HTTP communications in a secure manner.

Figure 9:
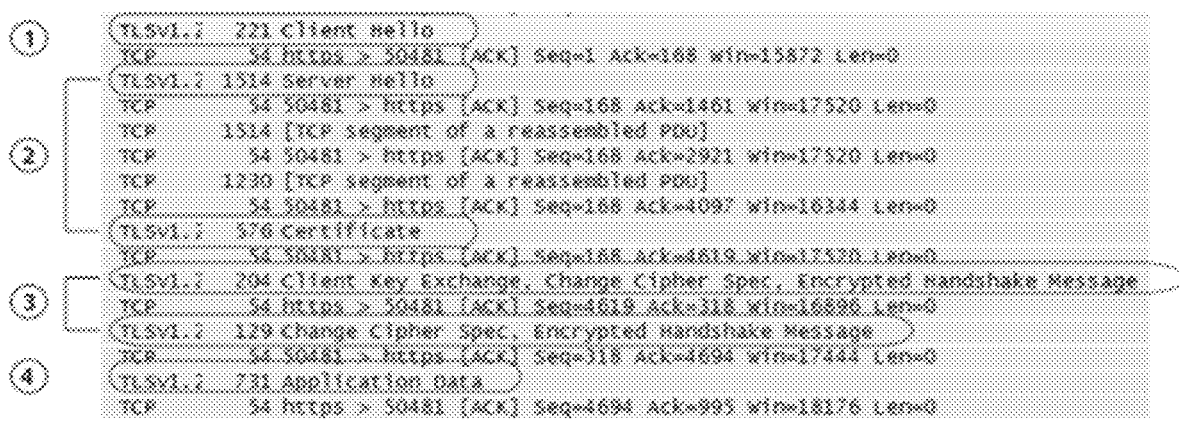
FIG. 9 is a screenshot of packet capture showing SSL packets as they are exchanged between a client and a server.

FIG. 9 is a screenshot of packet capture showing SSL packets as they are exchanged between a client and a server. The client sends its HTTPS request in the Client Hello. The entire HTTPS message is encrypted, including the headers and the request/response load. The actual hostname and domain name being accessed is not visible. How the cloud-based system 100 determines the destination hostname depends on whether it is operating in transparent mode or explicit mode. The server responds with its Hello message and its certificate. (A certificate is an electronic form that verifies the identity and public key of the subject of the certificate.) SSL uses the Public Key Infrastructure (PKI) to ensure the trustworthiness of the certificates. The client and server continue with the SSL negotiation. After the SSL tunnel is established, the application data is sent securely through the tunnel.

SSL uses Public Key Infrastructure (PKI) to ensure the trustworthiness of the certificates. PKI uses a trusted third party, called a Certificate Authority (CA), to guarantee the identity of an entity. When a CA verifies an entity's identity, it uses an algorithm, such as RSA, to generate a public and private key. It gives the private key to the requesting entity, and the public key is made available to the public. To authenticate itself to another party, the entity uses its private key to encrypt its certificate, and the other party uses the corresponding public key to decrypt it.

A CA issues certificates in a tree structure, with the root certificate as the top-most certificate. The CA signs the root certificate, which is considered trustworthy in many software applications, such as web browsers. Web browsers have the root certificates of many CAs.

A root certificate can sign and designate a certificate as an intermediate CA certificate, which can sign and designate other certificates as intermediate certificates as well. A certificate chain refers to the list of certificates that complete the chain of trust, from the trusted root CA certificate to any intermediate certificates and the certificate of an entity. The following is an example of a certificate chain.

---

The certificate of mail.google.com was signed by Google Internet Authority G2.
The certificate of Google Internet Authority G2 was signed by GeoTrust Global CA.
The certificate of GeoTrust Global was signed by Equifax Secure Certificate Authority.
The certificate of GeoTrust Global CA and Equifax Secure Certificate Authority are in the certificate store of the browser.

Perfect Forward Secrecy (PFS)

Perfect Forward Secrecy (PFS) is a feature of secure communication protocols that prevent compromised session keys. In the commonly used RSA key exchange, SSL sessions between the client and web server are encrypted with the public key and decrypted with the private key. If attackers access the server's private key, they can uncover the session keys and decrypt all conversations from past and future sessions.

In contrast, PFS uses either the standard Diffie-Hellman ephemeral key exchange (DHE) or the Elliptic Curve Diffie-Hellman ephemeral key exchange (ECDHE). DHE uses public-key cryptography, which generates keys with modular arithmetic. In DHE, there is not a link between the server's private key and session key, so the confidentiality of session keys are not dependent on the private keys. If attackers access the server's private key, they are unable to uncover the session key and decrypt the conversation. Furthermore, the server generates different session keys for each conversation with the client. If attackers compromise the session key, they are only able to decrypt the conversation for that particular session. To decrypt all conversations, they must compromise the session keys for every session.

ECDHE is like DHE but uses elliptic-curve cryptography. Elliptic-curve cryptography generates keys using algebraic curves. It is significantly faster than DHE and provides better performance. Elliptic-curve cryptography achieves equivalent security as RSA with smaller keys.

§ 7.1 SSL Inspection

HTTPS is an aggregate of HTTP and the SSL/TLS protocol, wherein the authentication and encryption capabilities of SSL/TLS protect HTTP communications. This is vital because the information that is sent on the Internet is passed along from one device to another before it reaches the destination server. Therefore, sensitive information, such as credit card numbers, usernames, and passwords, may be seen by intermediate devices if the information is sent in clear text over HTTP. When the information is encrypted and protected by the SSL protocol, only the intended recipient can read the information.

Unfortunately; the security provided by SSL is also being misused in a number of ways:

SSL encryption is used to hide dangerous content such as viruses, spyware, and other malware.

Attackers build their websites with SSL encryption.

Attackers inject their malicious content into well-known and trusted SSL-enabled sites.

SSL can be used to hide data leakage, for example, the transmission of sensitive financial documents from an organization or the like.

SSL can be used to hide the browsing of websites that belong to legal-liability classes.

As more and more websites use HTTPS, including social media, the ability to control and inspect traffic to and from these sites has become an important piece of the security posture of an organization.

The cloud-based system 100 can inspect HTTPS traffic from an organization. The service can scan data transactions and apply policies to it, as described herein. An enforcement node 150 can function as a full SSL proxy, or SSL man-in-the-middle (MITM) proxy.

The cloud-based system 100 can provide two options to protect HTTPS traffic: SSL inspection, or if SSL inspection is not feasible, one can configure a global block of specific HTTPS content.

Figure 10:
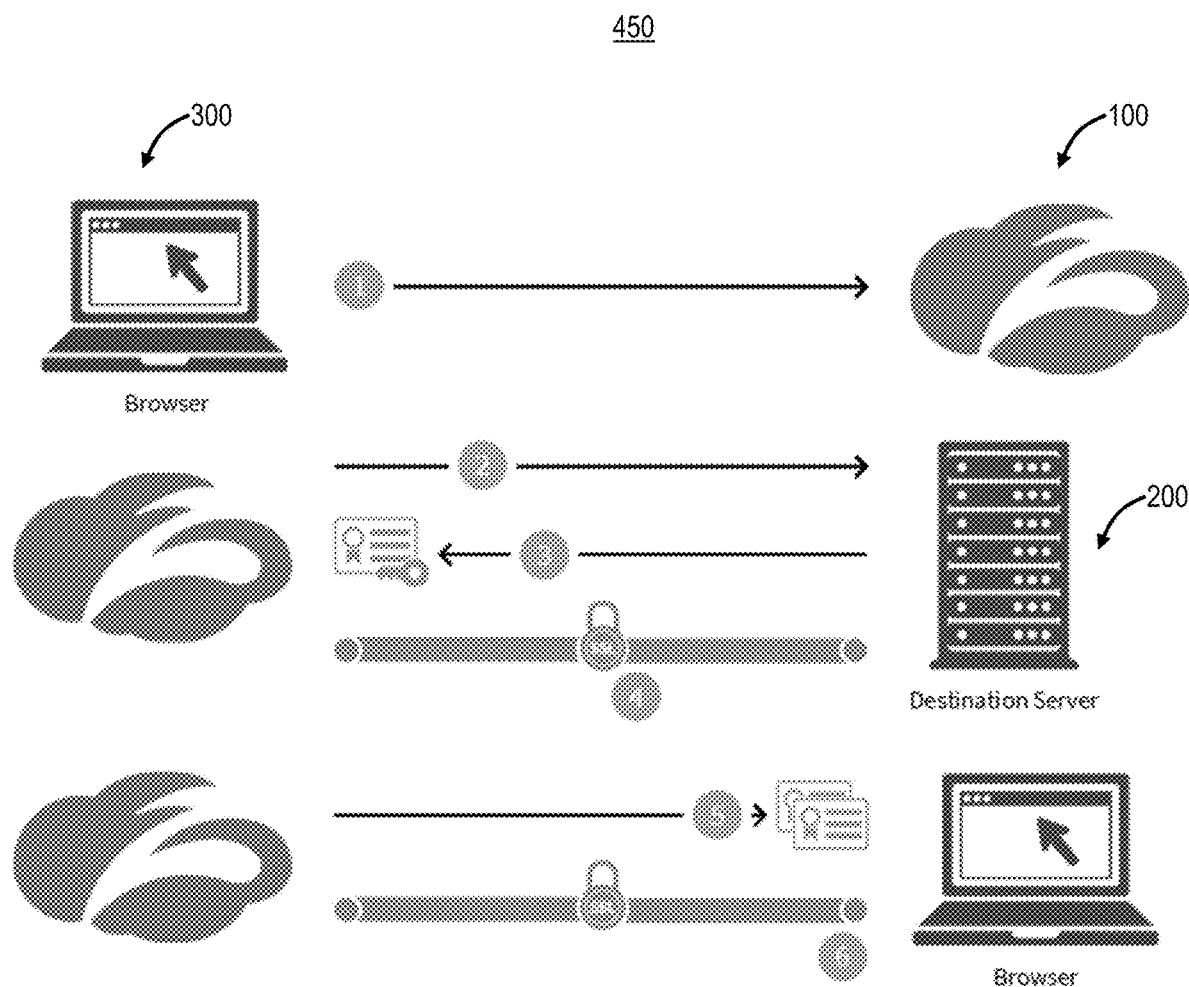
FIG. 10 is a flow diagram illustrating an embodiment of SSL inspection with the cloud-based system as a proxy.

FIG. 10 is a flow diagram illustrating an embodiment of SSL inspection 450 with the cloud-based system 100 as a proxy. In this embodiment, the cloud-based system 100 establishes a separate SSL tunnel with the user's browser and with the destination server. FIG. 10 illustrates the SSL inspection 450 process. First, a user (at the user device 300) opens a browser and sends an HTTPS request. Second, the cloud-based system 100 intercepts the HTTPS request. Through a separate SSL tunnel, the cloud-based system 100 sends its HTTPS request to the destination server (the server 200) and conducts SSL negotiations. The destination server sends the cloud-based system 100 its certificate with its public key. The cloud-based system 100 and destination server complete the SSL handshake. The application data and subsequent messages are sent through the SSL tunnel. The cloud-based system 100 conducts SSL negotiations with the user's browser. It sends the browser an intermediate certificate or an organization's custom intermediate root as well as a server certificate signed by the intermediate CA. The browser validates the certificate chain in the browser's certificate store. The cloud-based system 100 and the browser complete the SSL handshake. The application data and subsequent messages are sent through the SSL tunnel.

In an embodiment, the SSL inspection can use an intermediate certificate of the cloud-based system 100. With this option, the cloud-based system 100 dynamically generates and signs the server certificate that it presents to the client. This certificate contains the same fields as the original destination server certificate, except for the identifying information of the issuer, called the issuer distinguished name (ON). The issuer ON is set to the name of the cloud-based system 100 intermediate certificate. The browser receives this certificate signed by the cloud-based system 100 intermediate certificates along with the cloud-based system 100 intermediate certificate. To enable a browser or system to automatically trust all certificates signed by the cloud-based system 100 Certificate Authority, users must install the cloud-based system 100 Root CA certificate on their workstations.

In another embodiment, the SSL inspection can use a custom intermediate root certificate. One can subscribe to the Custom Certificate feature and configure a custom intermediate root certificate for SSL inspection. Here, the cloud-based system 100 does not use an organization's root certificate or private keys. Instead, it uses the custom intermediate root certificate signed by a trusted CA, so it is possible to use a CA that is already deployed on an organization's machines. To configure an intermediate root certificate, the cloud-based system 100 generates a certificate signing request (CSR) with a key pair (i.e., public and private key) and encrypts the private key using AES. The private key is stored securely in the central authority 152, while the CSR contains the public key.

After the CA signs the CSR, the signed certificate can be uploaded to the cloud-based system 100. During the SSL negotiation with the user's browser, the cloud-based system 100 dynamically generates and signs the server certificate that it presents to the client with this intermediate certificate. The certificate issuer is set to the organization name, and the cloud-based system 100 generates the certificate once per site and caches these certificates on the enforcement node 150. These cached certificates are usually valid until their expiration date.

In addition to the intermediate root certificate, it is possible to upload the certificate chain that includes any other intermediate certificates that complete the chain to the intermediate root certificate. When the certificate chain is uploaded, the cloud-based system 100 sends the intermediate root certificate along with this key chain and the signed server certificate to the users' machines during SSL inspection. If the certificate chain is not uploaded, the cloud-based system 100 sends only the organization's intermediate root certificate and its signed server certificate to the user's machine. Uploading the certificate chain provides important benefits. The certificate chain ensures that the users' machines can validate the server certificate signed by the organization's intermediate CA even if the users' browsers have only the root certificate in their certificate store. If the certificate is changed due to the compromise of an intermediate root certificate, or simply as a routine security measure, the ability to send the certificate chain to users' machines during SSL inspection is a key benefit. Because it enables certificate rotation efficiently without the need for a new key ceremony or certificate push to an organization's users.

The cloud-based system 100 provides a CRL (Certificate Revocation List) distribution point (CDP) for every certificate it generates so that client applications can locate the Certificate Revocation Lists (CRLs) as necessary.

§ 7.2 SSL Handshake Process

Figure 11:
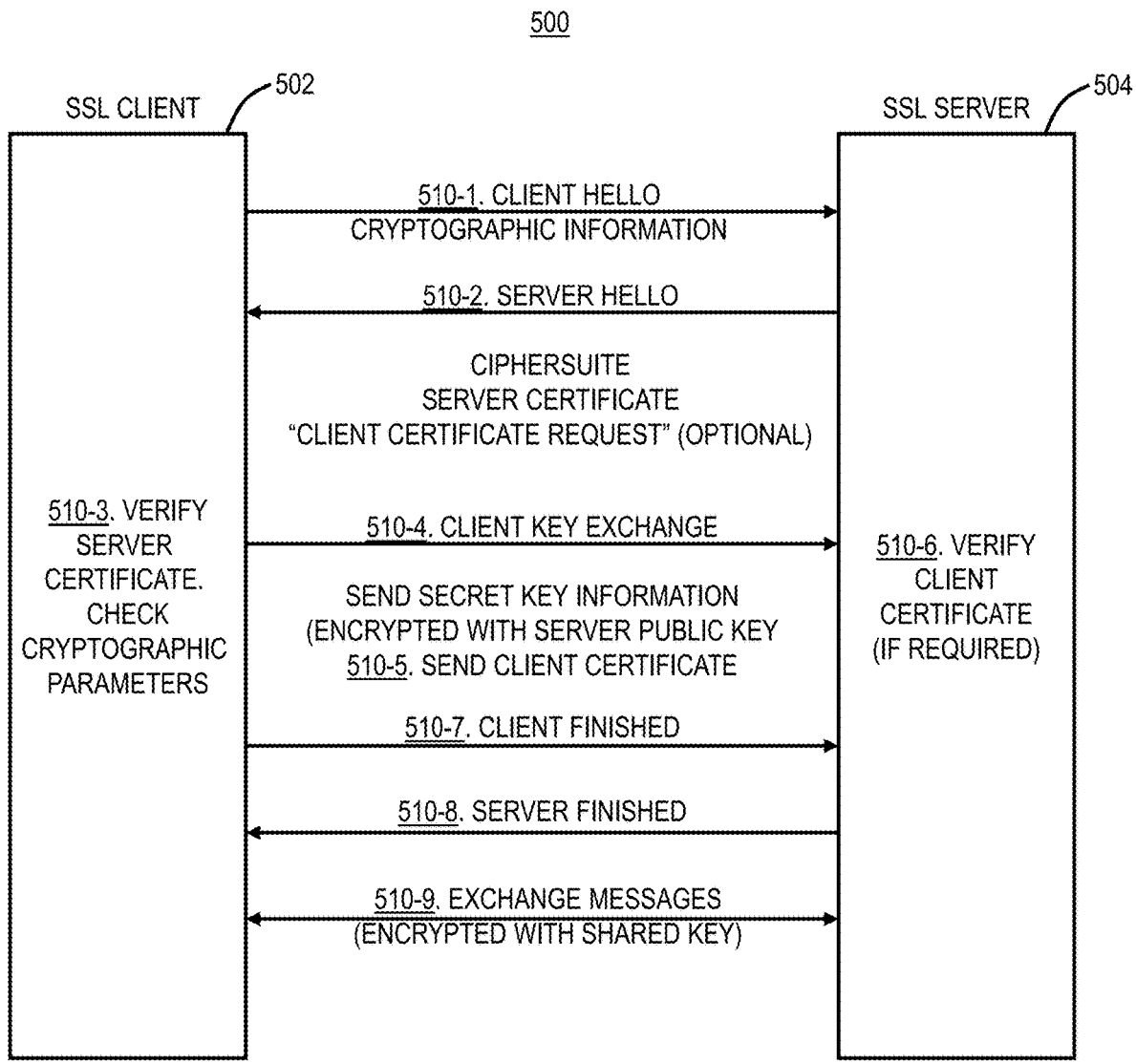
FIG. 11 is a flow diagram of details of an SSL handshake process between an SSL client and an SSL server.

FIG. 11 is a flow diagram of details of an SSL handshake process 500 between an SSL client 502 and an SSL server 504. The SSL client 502 can be the user device 300, etc. and the SSL server 504 can be a location on the Internet 104, etc., i.e., the server 200. That is, the SSL server 504 can be an endpoint for an encrypted tunnel with the user device 300. The SSL client 502 sends a "client hello" message that lists cryptographic information such as the SSL version and, in the client's order of preference, the CipherSuites supported by the SSL client 502 (step 510-1). The message also contains a random byte string that is used in subsequent computations. The protocol allows for the "client hello" to include the data compression methods supported by the SSL client 502.

The SSL server 504 responds with a "server hello" message that contains the CipherSuite chosen by the SSL server 504 from the list provided by the SSL client 502, the session ID, and another random byte string (step 510-2). The SSL server 504 also sends its digital certificate. If the SSL server 504 requires a digital certificate for client authentication, the SSL server 504 sends a "client certificate request" that includes a list of the types of certificates supported and the Distinguished Names of acceptable CAs. The SSL client 502 verifies the SSL server's 504 digital certificate (step 510-3).

The SSL client 502 sends the random byte string that enables both the SSL client 402 and the SSL server 504 to compute the secret key to be used for encrypting subsequent message data (step 510-4). The random byte string itself is encrypted with the SSL server's 404 public key. If the SSL server 504 sent a "client certificate request," the SSL client 502 sends a random byte string encrypted with the client's private key, together with the SSL client's 502 digital certificate, or a "no digital certificate alert" (step 510-5). This alert is only a warning, but with some implementations, the handshake fails if client authentication is mandatory. The SSL server 504 verifies the client's certificate if required (step 510-6).

The SSL client 502 sends the server a "finished" message, which is encrypted with the secret key, indicating that the SSL client 502 part of the handshake is complete (step 510-7). The SSL server 504 sends the SSL client 502 a "finished" message, which is encrypted with the secret key, indicating that the SSL server 504 part of the handshake is complete. For the duration of the SSL session, the SSL server 504 and SSL client 502 can now exchange messages that are symmetrically encrypted with the shared secret key (step 510-9).

§ 7.3 SSL Interception Proxies

Figure 12:
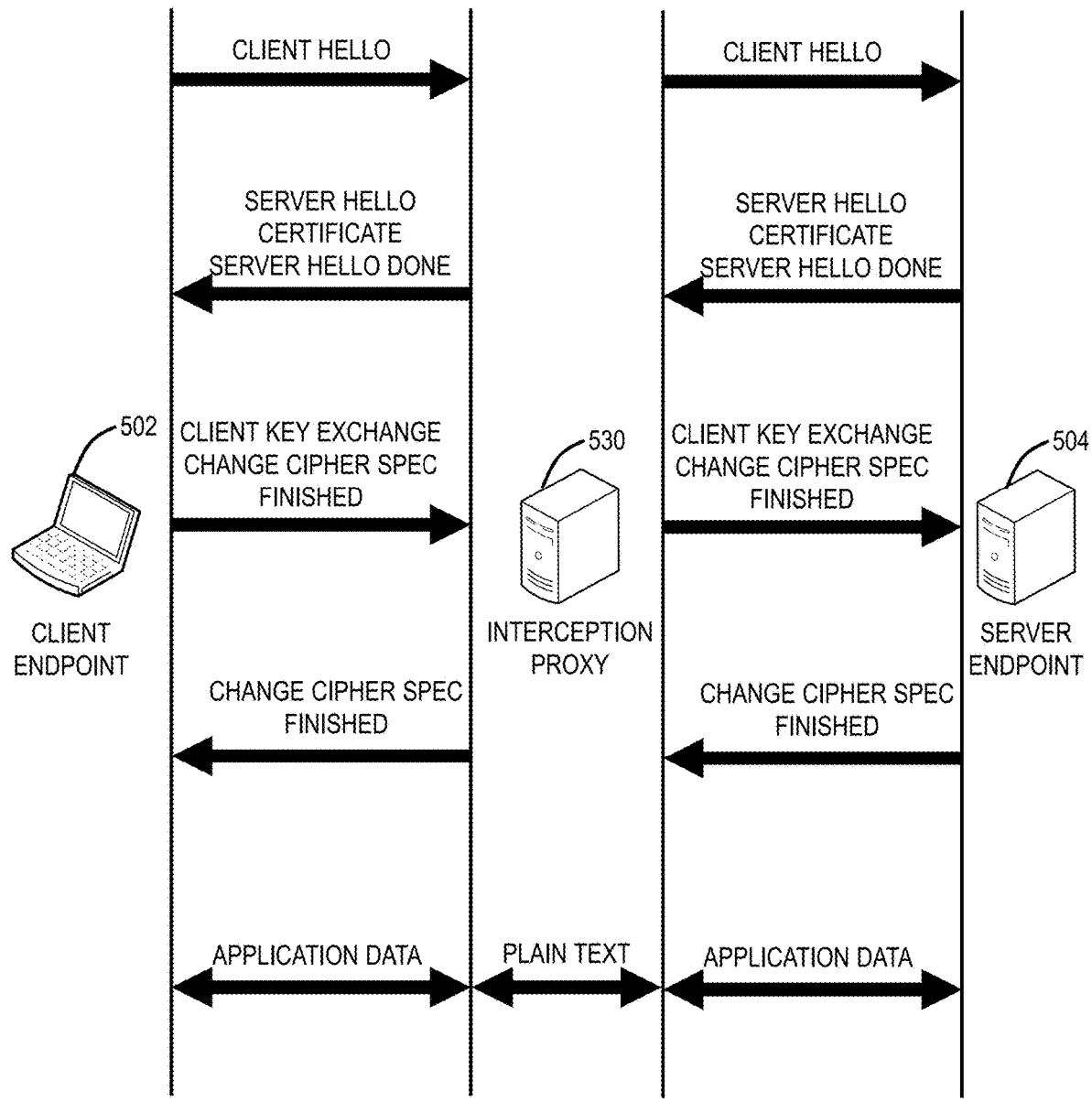
FIG. 12 is a flow diagram of a process performing SSL interception through an interception proxy in the handshake process.

FIG. 12 is a flow diagram of a process 520 performing SSL interception through an interception proxy 530 in the handshake process 500. The interception proxy 530 can be one of the enforcement nodes 150 in the cloud-based system 100. Enterprises deploy or use the interception proxy 530 to secure themselves from SSL-based threats, which are increasingly common. The interception proxy 530 works by acting as a MITM and modifying the encrypted channel. Whenever the SSL client 502 initiates a connection to a remote SSL server 504, the interception proxy 530 will intercept it and open two different channels of communication, one with the SSL client 502 and the other with the SSL server 504 that the SSL client 502 intended to talk to in the first place. This allows the interception proxy 530 to actively modify/inject the content from the SSL client 502 to the SSL server 504 or vice versa. This allows IT admins to perform malware scanning and other security functions on the otherwise encrypted content. In order to achieve this, an IT admin usually deploys proxy's ROOT CA certificate on the user devices 300 for the SSL clients 502 to trust the handshake which happens between the SSL client 502 and the interception proxy 530 which generates a certificate for every SSL server 504 that the SSL client 502 tries to communicate with. This naturally breaks with apps that employ certificate pinning for enhanced security. Note, while the term "interception proxy" is used herein, those skilled in the art will recognize this is a functional name and it may be called other names while being the same based on the functionality.

Advantageously, the interception proxy 530 enables interception, inspection, and filtering of content on an otherwise encrypted channel. For example, the cloud-based system 100 using the interception proxy 530 can perform DLP, web content filtering, malware detection, intrusion detection/prevention, firewall and Deep Packet Inspection (DPI), etc. The interception proxy 530 acts as the SSL client 502 on the SSL server 504 side and as the SSL server 504 on the SSL client 502 sides.

The interception proxy 530 performs SSL inspection by breaking or terminating the encrypted tunnel in the cloud-based system 100. Specifically, the enforcement node 150 is a proxy, and it has an encrypted tunnel with the client and another encrypted tunnel with the server. That is, this approach requires SSL/TLS/DTLS handshake/termination on the enforcement node 150 (in the cloud, on-premises, etc.). This approach, with the enforcement node 150 as a MITM proxy breaking the tunnel has limitations. Specifically, some applications use Certificate Pinning or other techniques to prevent MITM. With Certificate Pinning, the client is configured to only accept a specific certificate or a specific CA. In this case, the application will break when presented with a certificate signed by the cloud-based system 100, even if it is trusted.

This is done to ensure greater control over the communicating entities and to prevent the MITM attacks. The situation is somewhat of a paradox: entities such as Domain Name Systems (DNS) and CAs are trusted and supposed to supply trusted input. However, more and more applications are trying hard with pinning to eliminate this conference of trust. By pinning the certificate or the public key of the server certificate, an application no longer needs to depend on third-party entities such as DNS, CA, etc. when making security decisions relating to a peer's identity. This makes an app immune to MITM attacks. Pinning effectively removes the "conference of trust" by eliminating the set of entities that are beyond the control of a domain owner. Apps achieve this by accepting server certificates that strictly match a defined criterion, usually subject key information.

With the SSL interception, proxy servers are employed in the cloud-based system 100 are aware of the SSL encrypted communication and may need to intercept it in order to provide security services. Such filtering solutions are generally achieved through interception proxies that engage in deep packet inspection to resist SSL-based threats that may range from trivial viruses to sophisticated ransomware. The problem when apps employ certificate pinning is that they reject the connection during negotiation with an interception proxy on account of peer's (in this case, SSL proxy) untrusted certificate.

Such apps fail to function in the enterprise environment and fail to provide desired services leading to bad user experience and frustration. The apps would be rendered dysfunctional partially or completely due to the certificate pinning employed by them. They will terminate the connection upon receiving a server certificate from the proxy that does not match the criterion. This leads to bad user experience, and the cloud security system does not have any visibility or resolution of such issues.

As more and more viruses use encrypted channels to infect machines, it is imperative for enterprises to employ SSL interception proxies to protect users. This poses a conundrum as app developers would like to eliminate trust on third parties like CAs, which may be vulnerable to other attacks. To solve this issue, an IT admin may be lured to turn SSL interception off, which makes their enterprise security even worse. Hence, it is desirable for IT admins to selectively turn SSL interception off only for some trusted applications and domains. Since it is very hard for IT admins to know apriori which apps users will use or what domains the app may hit, which may even change over time, there is a huge need for a better tunneling solution.

The cloud-based system 100 has little or no idea about the dysfunctional apps. The client apps terminate the connection with or without an alert message to the server upon receiving the mismatched certificate. Further, the IT admin has no way to find all the apps and their server domains for which the app performs pinning. As a result, this design does not allow the users to use such apps while subscribing to the security or enterprise compliance policies. To make these apps functional again, the cloud-based system 100 cannot perform the SSL interception described in FIG. 10, e.g., bypass SSL interception.

§ 7.4 SSL Interception

Figure 13:
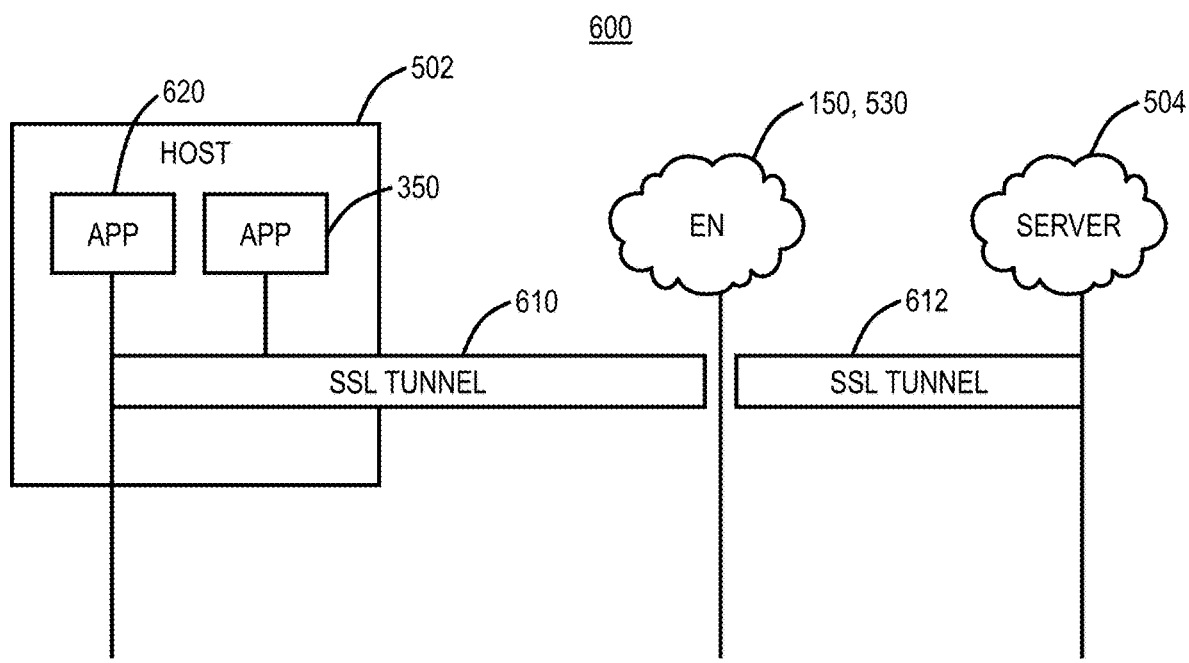
FIG. 13 is a network diagram of a network with an enforcement node operating as an interception proxy.

FIG. 13 is a network diagram of a network 600 with the enforcement node 150 configured as an interception proxy 530. As such, an interception proxy 530 in the cloud-based system 100 can selectively intercept SSL communications. In an embodiment, Internet-bound traffic of the user device 300 (the SSL client 502) is controlled through a tunnel 610 to the cloud-based system 100 which has a second tunnel 612 to the SSL server 504. The tunnel 610 acts as an intermediary passive MITM proxy that relays all the network requests and responses from client applications 620 to the cloud-based system 100. To achieve this, a process running on the host (the SSL client 502) installs a virtual interface on the user device 300. The process installs a default route on the interface in the device routing table and opens listening sockets for User Datagram Protocol (UDP) and Transmission Control Protocol (TCP) traffic at randomly available ports.

§ 7.5 SSL Inspection Based on Key Snooping

Figure 14:
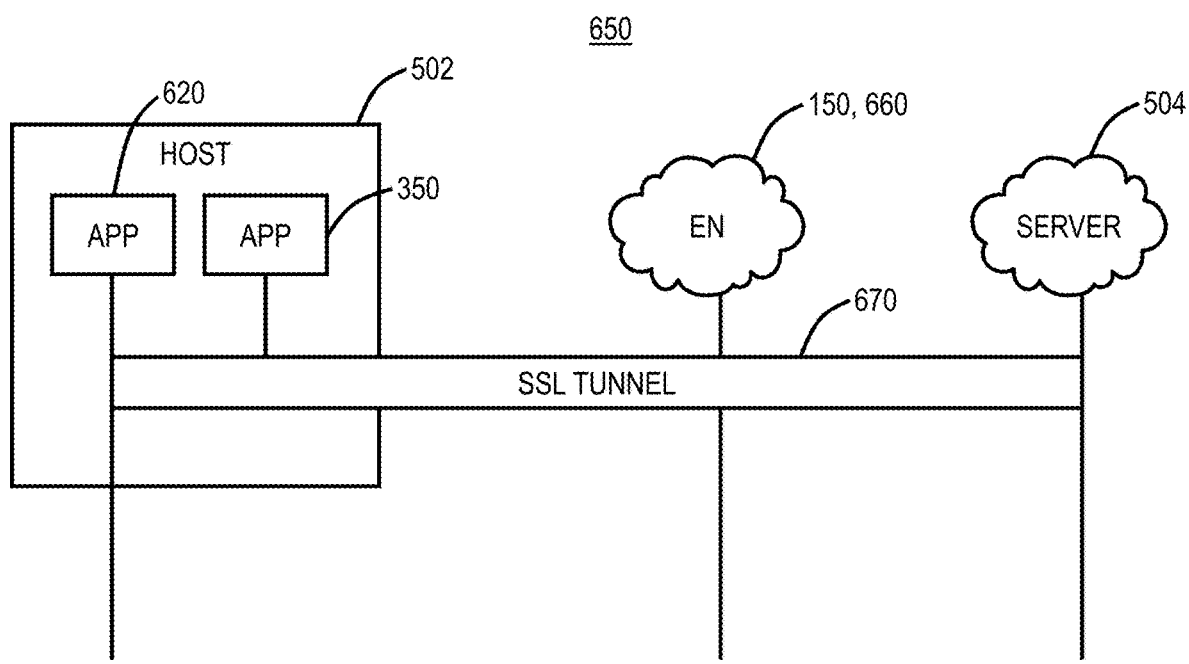
FIG. 14 is a network diagram of a network with the enforcement node operating as a snooping proxy to perform SSL interception without breaking the tunnel as with the interception proxy.

FIG. 14 is a network diagram of a network 650 with the enforcement node 150 operating as a snooping proxy 660 to perform SSL interception without breaking the tunnel as with the interception proxy 530. This presents a different approach for SSL interception than the interception proxy 530, which avoids the disadvantages of certificate pinning and certificate management. In the network 650, a tunnel 670 is between the SSL client 502 and the SSL server 504. Again, the tunnel 670 can be SSL, TLS, DTLS, HTTPS, etc. The key difference with the snooping proxy 660 relative to the interception proxy 530 is the snooping proxy 660 does not break the tunnel 670. Note, the snooping proxy 660 is still a MITM proxy like the interception proxy 530. Again, while the term "snooping proxy" is used herein, those skilled in the art will recognize this is a functional name and it may be called other names while being the same based on the functionality.

The snooping proxy 660 can be one of the enforcement nodes 150 in the cloud-based system 100. Also, the client 502 can be the user device 300 including the application 350. As described herein, the application 350 is a traffic-forwarding application that enables the user device 300 to operate (communicate) with the cloud-based system 100. The snooping proxy 660, being already a MITM proxy, can snoop (monitor) on the handshake process 500. This snooping can be at the enforcement node 150 operating as the snooping proxy 660 as well as at the application 350. This snooping can also use key agents, such as part of the application 350, operating system support hooks, such as at the user device 300, etc. The key aspect here is the snooping proxy 660 can snoop the handshake process 500 for purposes of obtaining keys.

Once the snooping proxy 660 has keys for a given session, the snooping proxy 660 can monitor the encrypted traffic on the tunnel 670. Note, typically, monitoring in the cloud-based system 100 is inline in a sense the enforcement node 150 sits directly between the client 502 (the user device 300) and the server 504 (or any other destination on the Internet 104, the cloud services 106, etc.). Here, the snooping proxy 660 is still inline. The snooping proxy 660 can receive encrypted traffic, view and inspect the traffic based on the snooping of the keys, and allow or block the traffic based on the inspection.

This approach solves the various limitations with a traditional MITM proxy as an interception proxy 530. That is, applications with certificate pinning now can support SSL inspection to block policy violations or malware transfers. This removes the need for certificate deployments with the cloud-based system 100. Also, it is possible to decode any other variant of SSL to inspect or detect application signature (aka DPI) inside an encapsulated layer or protocol. Further, this approach is completely transparent to primitive SSL-based applications such as FTPS, which cannot trust MITM root certificates. Finally, this allows granular policy control and transactional visibility for critical or productivity applications without breaking the SSL protocol.

§ 7.6 SSL Profile Construction, Learning and Transfer of Knowledge

In either SSL environment, namely the interception proxy 530 and the snooping proxy 660, for every new connection, the application 350 process on the device can create a state machine or the like for the transaction, and, based on the results of the transaction, the process constructs a profile for the SSL client 502 which initiated the connection. For every connection, the process can construct a profile for the connection as a tuple: <Origin, Host-Name, Destination-Socket-Address, Handshake-Status, Key information>.

The origin is the client application 620, which is originating a request. The origin information is obtained through a process to port mapping on the host machine. The Host Name is the fully qualified domain name of the SSL server 504 that the SSL client 502 is trying to reach. The hostname is retrieved from the SNI (Server Name Indication) parsed as a TLS extension in the Client Hello SSL record. The Destination Socket contains information about Destination-Server-IP-Address:Destination-Port that the SSL client 502 is trying to establish a connection. This information is retrieved by parsing the IP-packet header during connection establishment.

The Handshake Status is a bit flag that keeps a record of SSL handshake messages exchanged with the SSL server 504. The flag is set to 1 if the handshake succeeds, and the client starts sending Application Data to the server. The profile is learned for every transaction and reevaluated whenever the SSL client 502 tries to reach the same destination. This knowledge is periodically transferred to the cloud-based system 100 out-of-band on a persistent control channel that allows the cloud-based system 100 to learn the behavior of client apps 620 with SSL interception.

To construct this profile, the process passively observes the SSL Record Layer data messages and keep track of all the records that have been exchanged for any given transaction. For example, the process can parse the SSL headers to check if the SSL client 502 returns an SSL alert and/or if application data is sent over the connection. The process can parse the initial (K) server bytes and check the intermediate CA certificate from the enforcement node 150. The process can find the processes and host corresponding to the connection.

The following SSL handshake messages can be recorded:

Client hello to determine the SSL server 504 the SSL client 502 wants to connect with. The SNI host field provides the information.

Server Hello to determine the server response towards the client request and client supported ciphers.

A certificate that contains the certificates advertised by the SSL server 504 and which is used to check if SSL interception is enabled for the transaction.

Alert (optional), which indicates if the SSL client 502 rejected the certificate and the reason for rejection.

Application data which indicates the successful handshake since the application data is exchanged now.

This process can be extended to generate more detailed profiles containing the ciphers supported by the SSL client 502 and the SSL server 504, SSL version, certificate chain, etc.

Every SSL message is sent as part of the Record Layer Protocol which provides messages in the following format:

| Content type (1 Octet) | Version (2 Octets) | Length (2 Octets) | Data |
| --- | --- | --- | --- |

§ 7.7 Security Functions on Traffic with SSL Inspection, Either with the Interception Proxy or the Snooping Proxy The cloud-based system 100 can support various security functions on encrypted traffic, including:

Granular URL filtering and cloud app control policies where the cloud-based system 100 can enforce granular user, group, and location policies that not only control access to sites or applications but also control what a user can do within an application. For example, it is possible to define a Web email policy that allows users to view and send mail, but not attachments, or a social media policy that allows users to view Facebook, but not post.

Skipping Inspection for Specific URLs/URL categories: When configuring SSL Inspection policy, it is possible to prevent the service from inspecting sessions to certain URLs or URL categories (for example, in the Banking and Healthcare URL categories). This list can apply globally through an organization as well as granular to users, groups of users, etc.

Skipping Inspection for Specific Cloud Applications/Cloud Application Categories: When configuring SSL Inspection policy, it is possible to prevent the cloud-based system 100 from inspecting transactions to specific cloud applications or cloud application categories. This list can apply globally through an organization as well as granular to users, groups of users, etc.

Content Filtering where the cloud-based system 100 is enabled to block malicious or inappropriate content in a page, such as during a Google search.

Block Undecryptable Transactions: wherein the cloud-based system 100 is configured to block the transactions of applications that the cloud-based system 100 cannot decrypt because of using non-standard encryption methods and algorithms, as well as where snooping fails and where the interception proxy 530 encounters certificate pinning.

Block Advanced Persistent Threats (APT) in encrypted traffic. Note, most targeted malware is now delivered over SSL.

Control access to Google consumer apps and non-corporate Google accounts.

Block access to sites with revoked certificates: The cloud-based system 100 supports OCSP (Online Certificate Status Protocol) to verify the validity of all server certificates. It verifies the OCSP responder URL in a server's certificate and sends an OCSP request to the responder. The cloud-based system 100 allows access if the responder indicates that the certificate is Good, and blocks access if the responder responds that the certificate is Unknown or Revoked. The cloud-based system 100 displays a notification when it blocks access to a site due to a bad certificate (if the certificate issuer is unknown, or if the certificate has expired, or if the Common Name in the certificate does not match). It also logs these transactions with "bad server cert" in the policy field.

Data Loss Prevention (DLP): The cloud-based system 100 can enforce the DLP policy when SSL inspection is enabled.

Of note, the enforcement node 150 can be configured, not as a caching proxy. Data is inspected in the enforcement node's 150 memory after decryption and sent out to the client immediately. Even when a core dump is taken on the enforcement node 150, SSL (encrypted) session data is cleared before the dump file is created. SSL session data is never written to disk.

§ 7.8 SSL Inspection Process by Snooping

Figure 15:
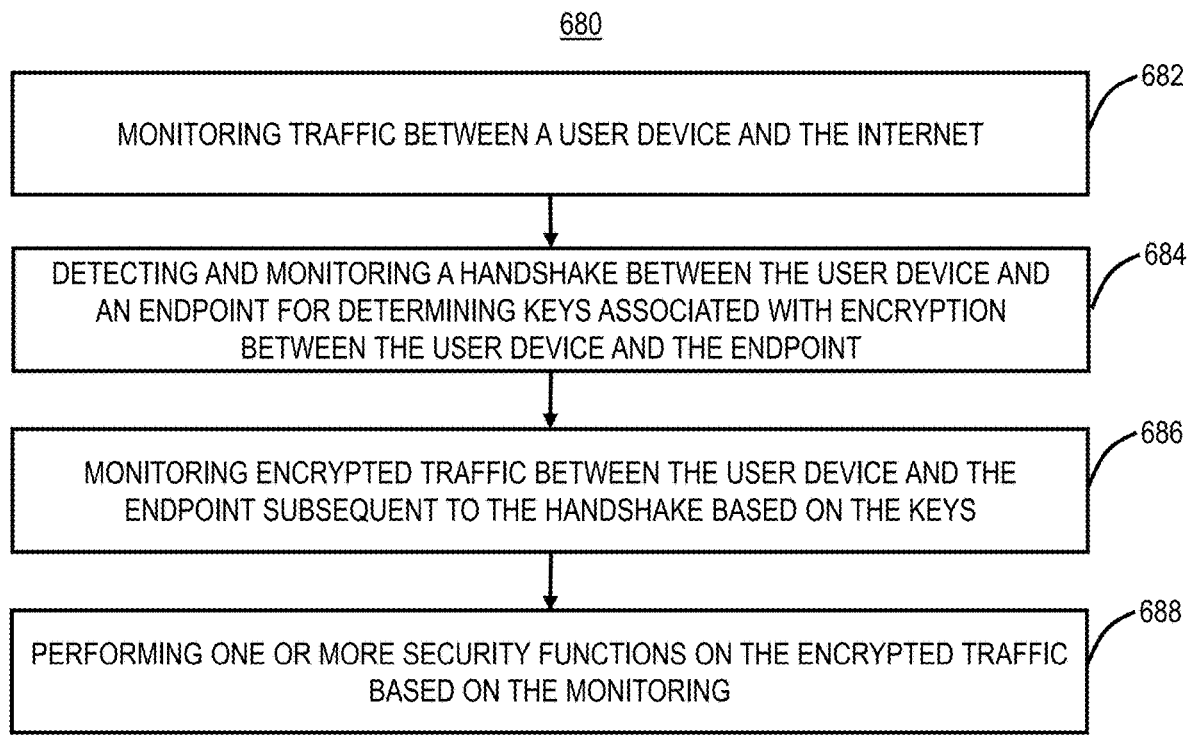
FIG. 15 is a flowchart of a process for SSL (or other type of encrypted traffic) inspection by snooping, such as via a node operating as the snooping proxy.

FIG. 15 is a flowchart of a process 680 for SSL (or other type of encrypted traffic) inspection by snooping, such as via a node operating as the snooping proxy 660. The process 680 contemplates implementation as a method, as a computer-readable code stored on a non-transitory computer-readable storage medium for programming the node operating as the snooping proxy 660, and the node operating as the snooping proxy 660.

The process 680 includes monitoring traffic between a user device and the Internet (step 682); detecting and monitoring a handshake between the user device and an endpoint for determining keys associated with encryption between the user device and the endpoint (step 684); monitoring encrypted traffic between the user device and the endpoint subsequent to the handshake based on the keys (step 686); and performing one or more security functions on the encrypted traffic based on the monitoring (step 688). The node can be the enforcement node 150 that is part of a cloud-based security system, i.e., the cloud-based system 100, and configured inline between the user device and the endpoint.

The process 680 can further include one of blocking or allowing the encrypted traffic based on the one or more security functions. The one or more security functions can include any of access control, threat prevention, and data protection, as described in detail herein. The endpoint can include an application utilizing certificate pinning. The process 680 can further include obtaining data related to the keys from a traffic-forwarding application executed on the user device. The process 680 can further include blocking the encrypted traffic responsive to being unable to decrypt the encrypted traffic with the keys.

§ 8.0 Encrypted Tunnel Inspection with Customer CA

Figure 16:
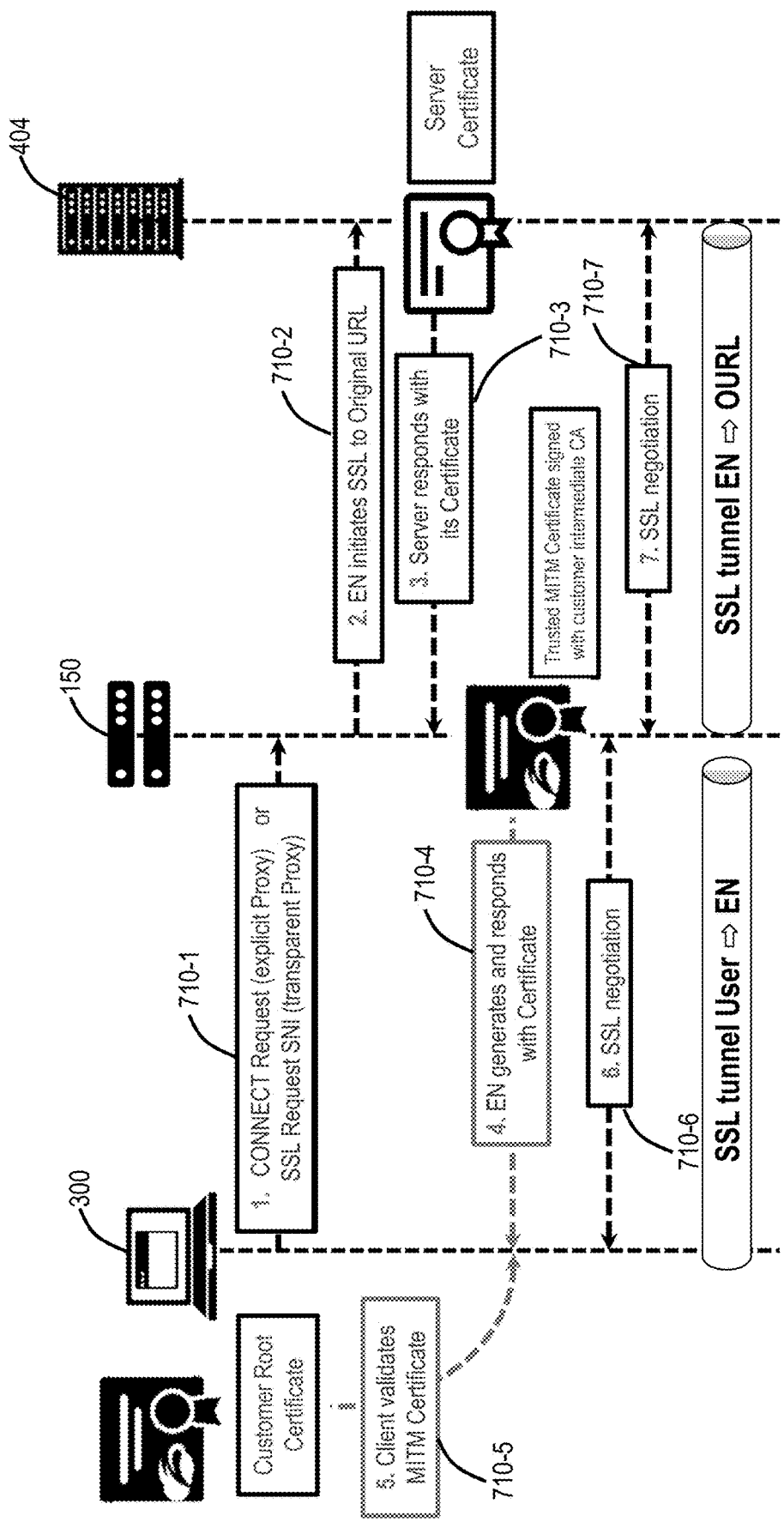
FIG. 16 is a diagram of encrypted tunnel inspection with the cloud-based system.

FIG. 16 is a diagram of encrypted tunnel inspection with the cloud-based system 100. FIG. 16 includes a user device 300, an enforcement node 150, and an end server 404, for illustrating MITM inspection. The user device 300 is configured to communicate with the end server 404, with the enforcement node 150 being an inline device, e.g., proxy. The user device 300 sends either a CONNECT request (explicit proxy) or SSL request service name indication (SNI) (transparent proxy) to the enforcement node 150 (step 710-1). The enforcement node 150 initiates SSL to the original URL (from the request) of the server 404 (step 710-2). The server 404 responds to the enforcement node 150 with its certificate (step 710-3). The enforcement node 150 generates and responds with a certificate (step 710-4). Here, the enforcement node 150 has a trusted MITM certificate signed with the customer intermediate CA. This is where the cloud HSM fits—the enforcement node 150 makes a request to the cloud HSM to sign a MITM certificate's CSR (cert signing request) digest if it doesn't have the cert already cached in the data center.

The user device 300 validates the MITM certificate (step 710-5), and SSL is negotiated between the user device 300 and the enforcement node 150 (step 710-6). SSL is negotiated between the enforcement node 150 and the server 404 (step 710-7). The enforcement node 150 now can view and inspect encrypted traffic between the user device 300 and the server 404.

§ 8.1 Key Safeguarding

Figure 17:
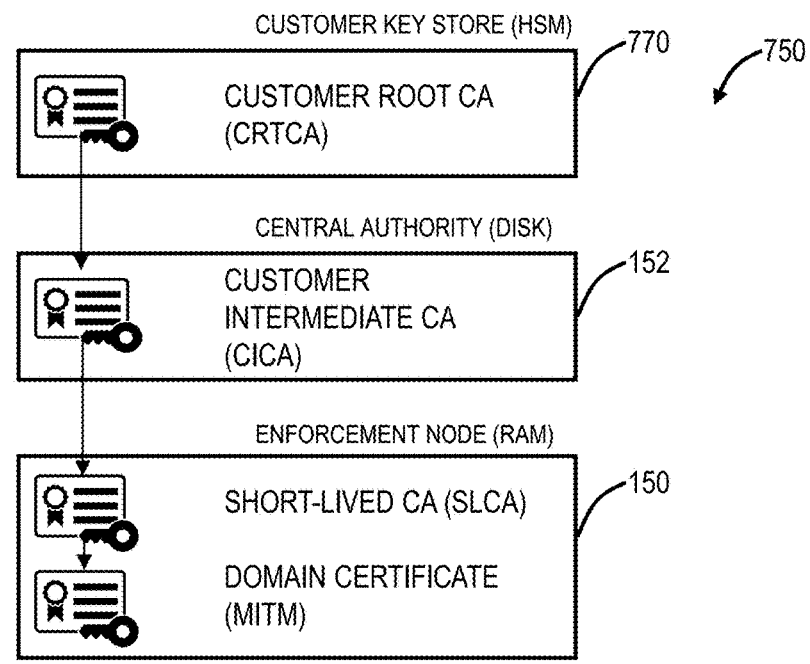
FIG. 17 is a diagram of key storage and key distribution, in an embodiment, in the cloud-based system.
Figure 17:
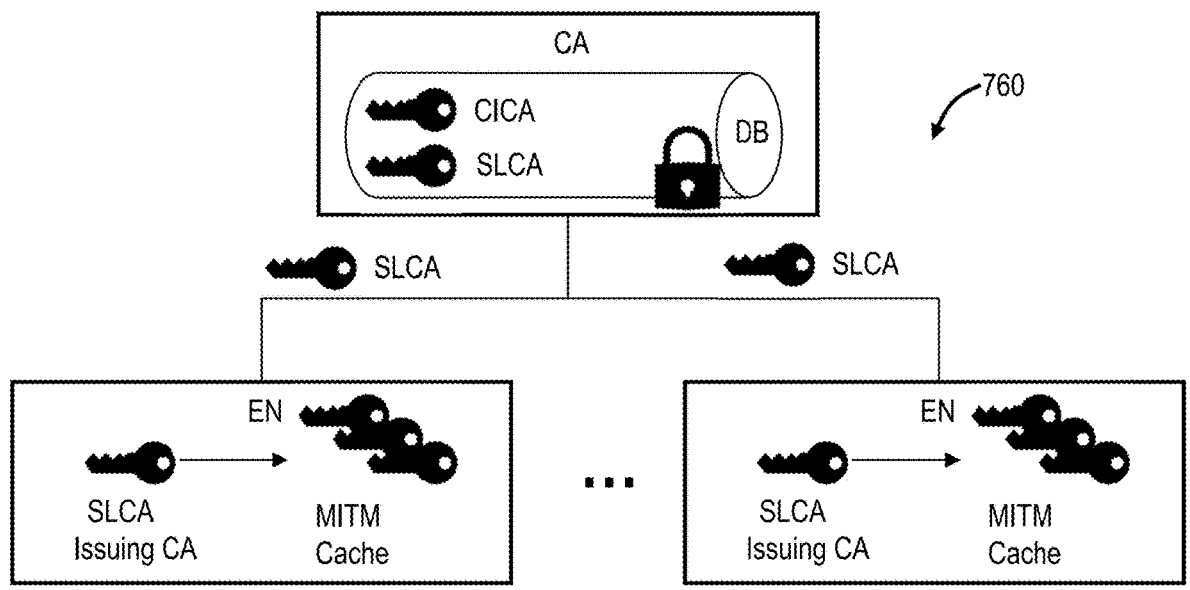
Figure 18:
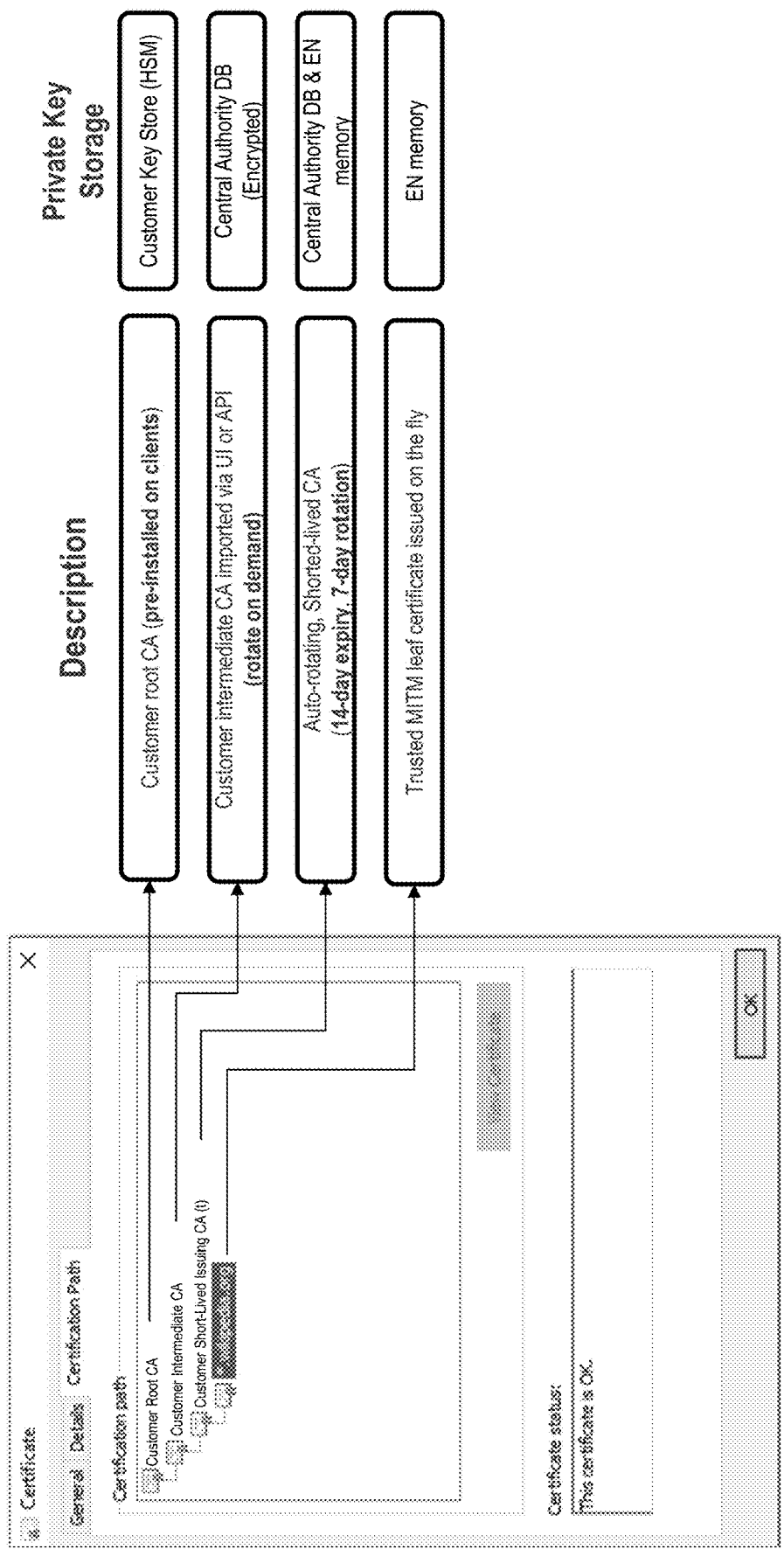
FIG. 18 is a diagram illustrating certificates, their descriptions, and private key storage, based on FIG. 17.

FIG. 17 is a diagram of key storage 750 and key distribution 760, in an embodiment, in the cloud-based system 100. The key storage 750 can include a customer root certificate in a customer key store 570 that includes an HSM, a customer intermediate CA stored at the central authority 152 or in the cloud HSM, and a short-lived CA and a domain certificate (MITM) stored in memory at the enforcement node 150. Of note, the customer intermediate CA stored at the central authority 152 is stored on a disk. For the key distribution 760, the central authority 152 sends the short-lived CA to the enforcement nodes 150 which use them to get domain certificates. In the cloud HSM model, the central authority 152 does not need to send any short-lived CA private to the enforcement nodes—that's what cloud HSM solves. Instead, the central authority sends a short lived authenticate token (oauth) to the cloud HSM service, which will, in turn, be used by the enforcement node to request the signing of a MITM certificate on the fly. FIG. 18 is a diagram illustrating certificates, their descriptions, and private key storage, based on FIG. 17.

There can be various techniques to secure the intermediate CA private keys, but the crux of the problem is that the approach above stores the intermediate CA private key itself in a SQL DB and the short-lived issuing CA keys both on disk and in memory. Storing CA keys on disk or in memory is considered a risky design that FSI and banking customers cannot live with. Techniques for safeguarding can include, for example, auto rotating the short-lived CA to ensure the intermediate CA key exists for its entirety in a single server, only having short-lived keys on the enforcement nodes 150, only having short-lived keys held in memory, minimal usage of the intermediate CA key at the central authority 152, and the like. The technique can also include separation of duties—No CloudOps engineer access to code; No developer access to production (Central Authority); Stringent access to production systems—role-based access control with three factor authentication (ISO 27001, SOC-II); Logging and monitoring—extensive, of all commands executed on production host and jump servers (ISO 27001); File Integrity Monitoring—continuous deployment of critical files in case of unauthorized modification; and the like.

§ 8.2 Motivation and Requirements

1) Every certificate private key issued from a customer's enterprise PKI and residing in the boundary of the cloud-based system 100, must persist for its entire lifetime in a FIPS 140-2 Level 3 HSM.

2) The HSM has to have a hardware form factor And FIPS 140-2 Level 3 validated—not a "software HSM"

3) The feature has to provide a turnkey solution in which the cloud-based system 100 owns and manages the HSM.

4) Optionally, the solution can use a managed HSM solution by a public Cloud Vendor—not a dedicated HSM appliance that requires complex management and has high costs.

5) The design should be agnostic as possible to the underlying HSM vendor and form factor. It should flexible enough to allow for possible integration with a customer managed HSM, through standard protocols such as REST, PKCS #11, KMIP. It should be flexible to "easily" swap between a different cloud HSM vendor in the future or even with an HSM appliance.

6) The solution should allow a customer to switch, without any downtime, between an existing software protection key and hardware based key protection.

§ 9.0 Cloud HSM System for MITM Inspection

Figure 19:
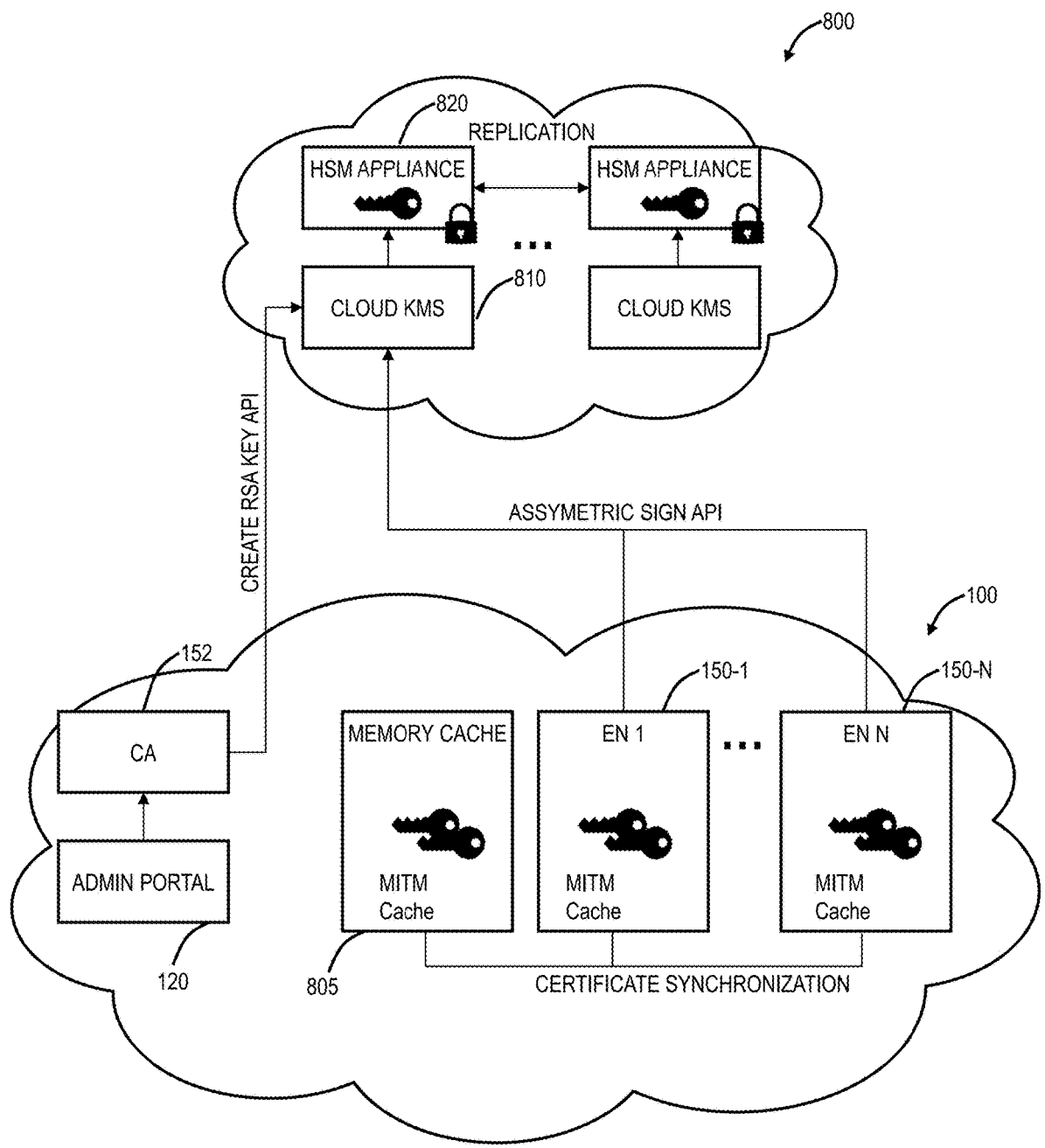
FIG. 19 is a network diagram of the cloud-based system and a cloud HSM system.

FIG. 19 is a network diagram of the cloud-based system 100 and a cloud HSM system 800. The cloud-based system 100 includes MITM domain certificates stored at the enforcement nodes 150, and synchronized therebetween including in a memory cache 805, as well as in different data centers. The cloud HSM system 800 can be a separate cloud system, i.e., a different cloud provider from the cloud-based system 100, as well as part of the cloud-based system 100. In this example, the cloud HSM system 800 is illustrated as a separate system, but those skilled in the art will recognize it can also be integrated. The cloud HSM system 800 includes a cloud key management system (KMS) 810 and HSM appliances 820 that are physical hardware.

Figure 20:
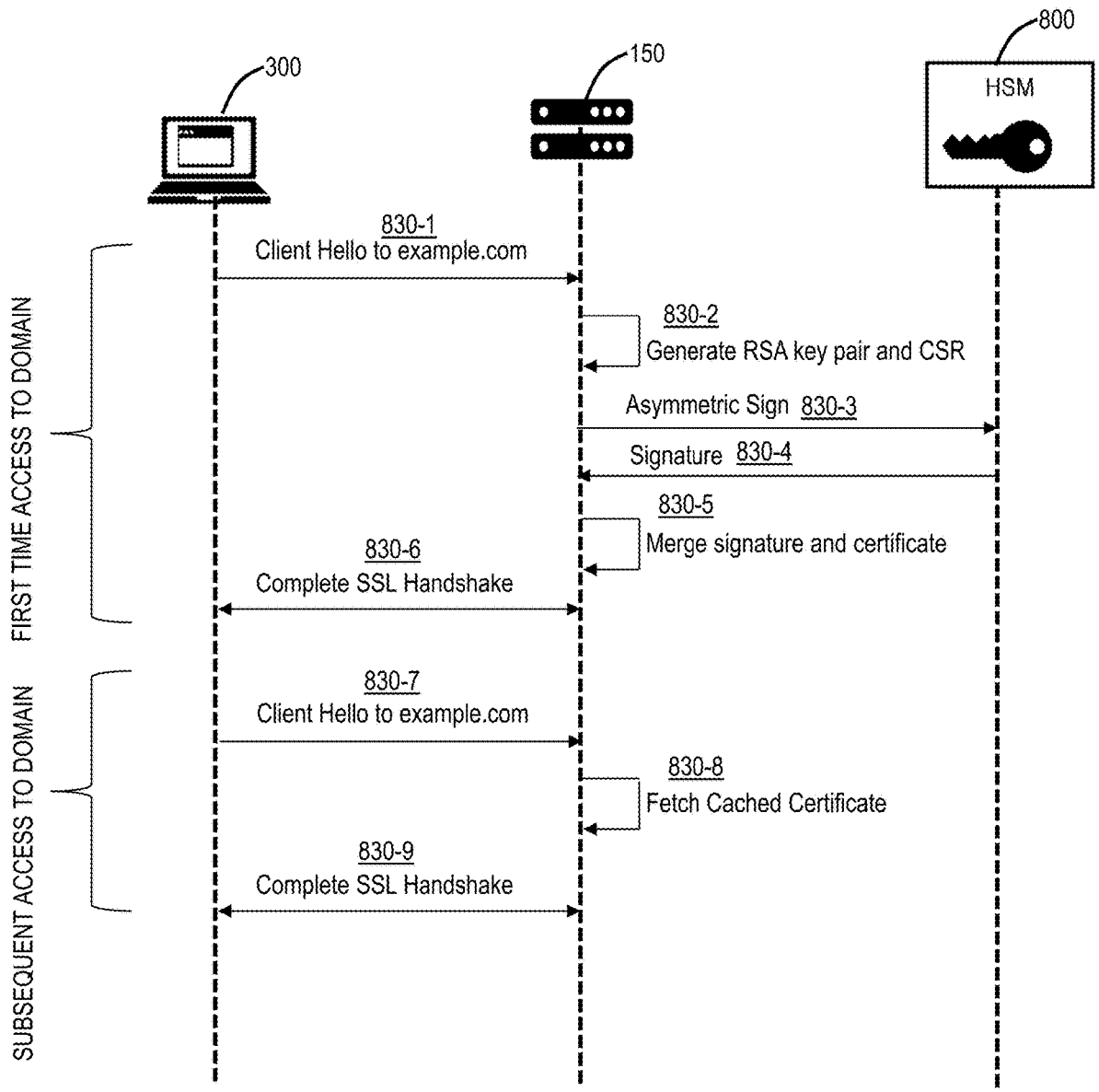
FIG. 20 is a diagram illustrating workflow between a user device, an enforcement node, and a cloud HSM system.

FIG. 20 is a diagram illustrating workflow between the user device 300, the enforcement node 150, and the cloud HSM system 800. Again, the design objective is that any certificate private key issued from the Enterprise PKI (Root or iCA) that has the power to issue subordinate certificates of any kind must be generated in and persist for its entire lifetime in a FIPS 140-2 Level 3 HSM, namely the HSM appliance 820 in the cloud HSM 800. As such, the customer intermediate CA (CICA) is not stored at the central authority 152, as in FIG. 17. Also, the approach described here removes the need for the short-lived certificates.

The enforcement nodes 150 will make a request to the cloud HSM 800 only for certificates that are not in its cache. Once the certificate is created, it will be stored inside the cache for all subsequent requests to the same domain. A key assumption is that domain certificate keys (MITM) do NOT need to reside in the HSM.

FIG. 20 illustrates an example workflow which is segmented between the first access to a domain and subsequent access to the domain, e.g., example.com. For the first access to the domain, the user device 300 sends a hello to example.com which is intercepted by the enforcement node 150 (step 830-1). The enforcement node 150 uses an RSA (Rivest—Shamir—Adleman) key pair and certificate signing request (CSR) (step 830-2). The enforcement node 150 makes an asymmetric sign request to the cloud HSM 800 (step 830-3), and the cloud HSM 800 returns a digital signature (step 830-4). The enforcement node 150 merges the digital signature and certificate (step 830-5) and completes the SSL handshake (step 830-6). This certificate is then cached.

For subsequent access to the domain (step 830-7), the enforcement node 150 fetches the cached certificate (step 830-8) and completes the SSL handshake (step 830-9).

Whenever the enforcement node 150 intercepts an SSL connection to a destination domain for which a MITM certificate does not already reside inside the local certificate/key cache, it will make a signing request for the MITM CSR to the HSM that holds the intermediate CA private key. The HSM, in turn, will respond with the digital signature for the certificate. In this methodology, the cleartext CA private key is used only within the FIPS boundaries of the HSM.

Figure 21:
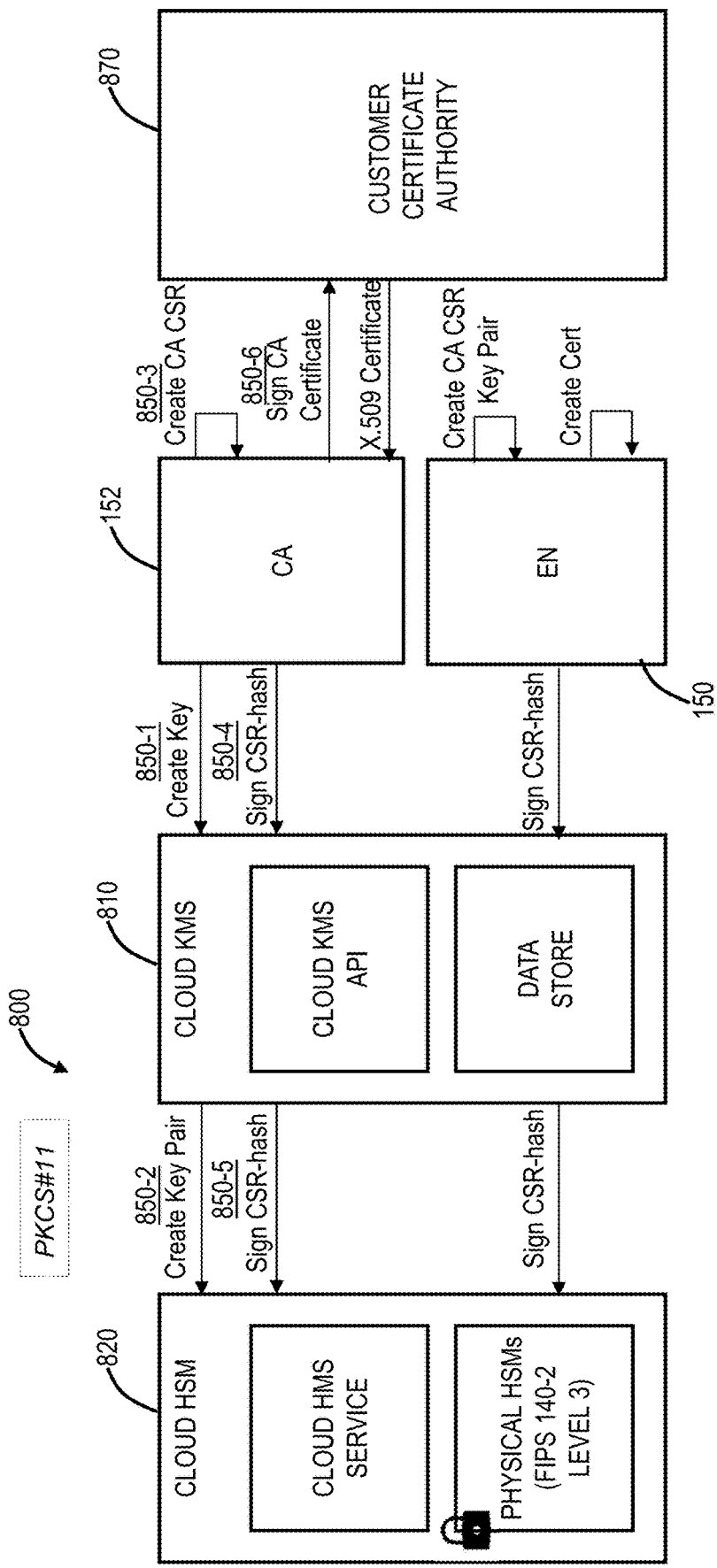
FIG. 21 is a diagram of interactions between the cloud-based system and the cloud HSM.

FIG. 21 is a diagram of interactions between the cloud-based system 100 and the cloud HSM 800. Of note, there are two workflows 850, 860 including CA enrollment 850 and MITM runtime 860. The CA enrollment 850 is performed between the central authority 152, a customer certificate authority 870, and the cloud HSM 800, including the cloud KMS 810 and the HSM appliance 820. The CA enrollment 850 is performed up front, to enroll the customer key. The MITM runtime 860 is performed at runtime, and includes the example workflow of FIG. 20. The cloud HSM include the cloud KMS 810 and the HSM appliance 820 which can communicate using PKCS #11, such as described in 07/2020: OASIS PKCS #11 v3.0, the contents of which are incorporated by reference. The cloud-based system 100 can communicate to the cloud KMS 810 via a Representational state transfer (REST) API.

The CA enrollment 850 includes the central authority 152 requesting creation of a key from the cloud KMS 810 (step 850-1). The cloud KMS 810 requests the HSM appliance 820 to create a key pair (step 850-2) for the intermediate central authority. Also, the central authority 152 creates a customer certificate authority CSR (step 850-3), sends a sign CSR-hash to the cloud HSM 810 (step 850-4) which sends the sign CSR-hash to the HSM appliance for signing 820 (step 850-5). The central authority 152 requests the customer certificate authority 870 to issue the certificate by signing the CSR (step 850-6) and returns an X.509 certificate to the central authority 152 (step 850-6).

Figure 22:
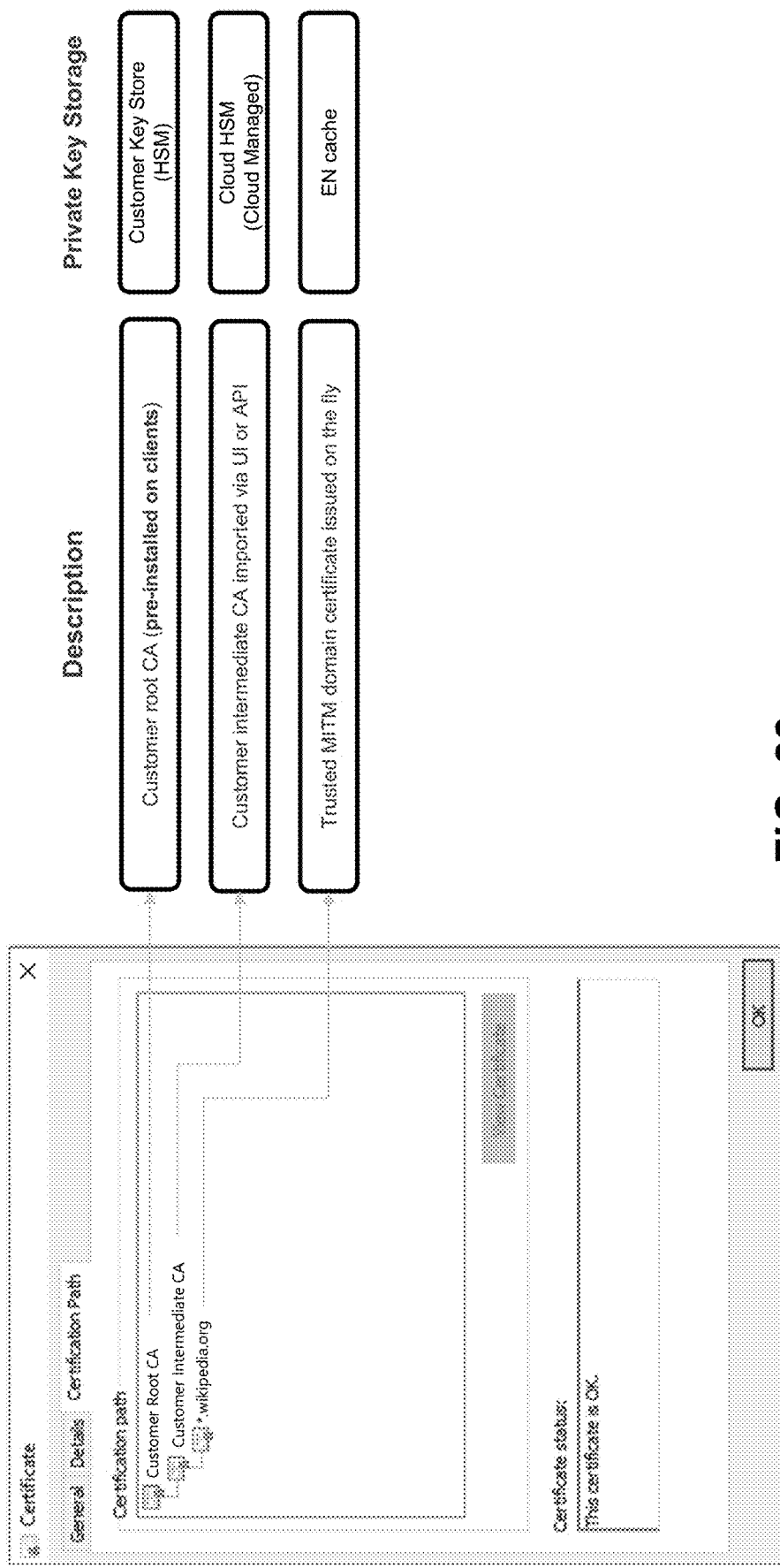
FIG. 22 is a diagram illustrating certificates, their descriptions, and private key storage, based on FIG. 21.

The MITM runtime 860 is the same as the workflow of FIG. 20. FIG. 22 is a diagram illustrating certificates, their descriptions, and private key storage, based on FIG.

Figure 23:
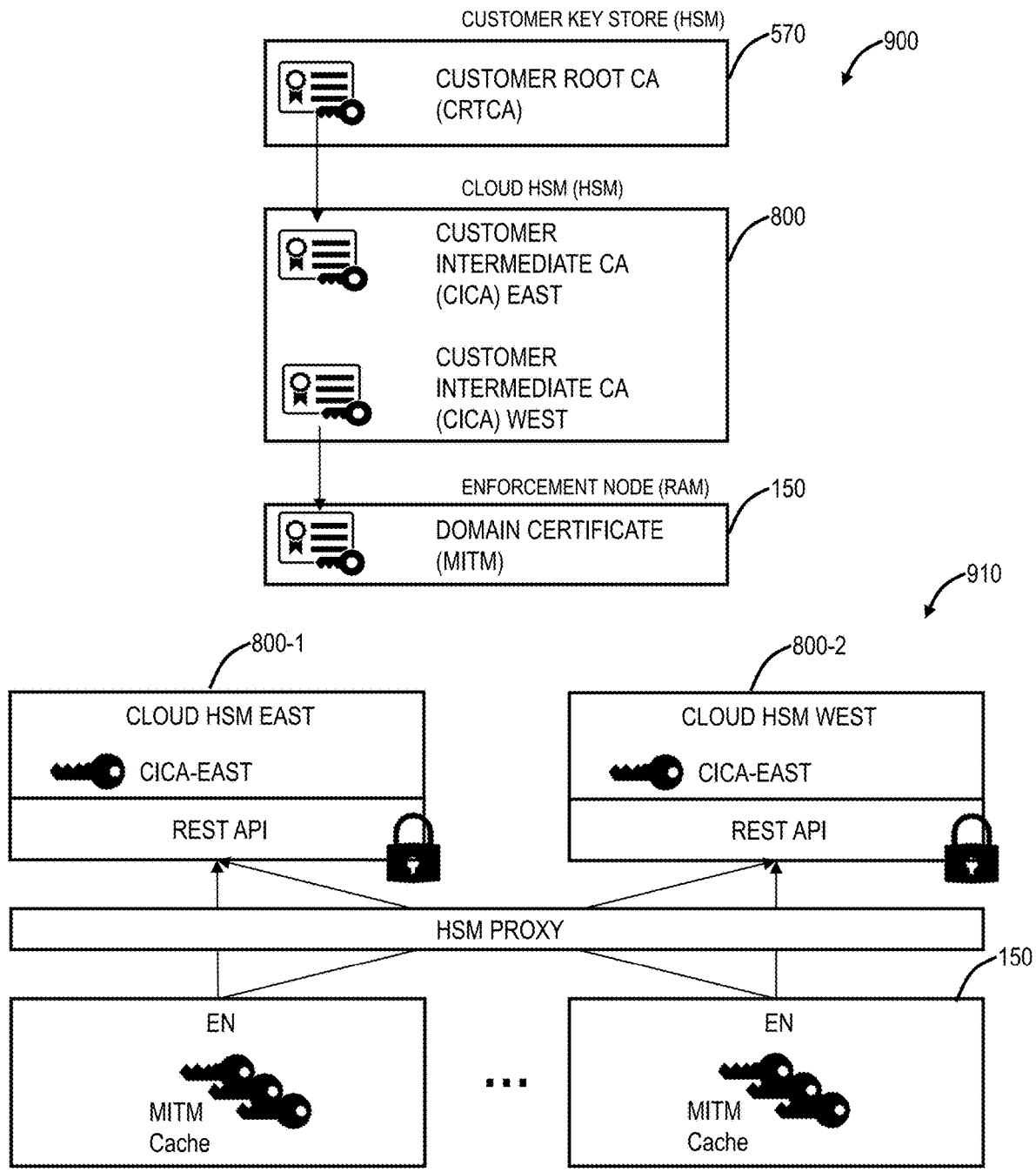
FIG. 23 is a diagram of key storage and key distribution with the cloud HSM, in an embodiment, in the cloud-based system.

FIG. 23 is a diagram of key storage 900 and key distribution 910 with the cloud HSM 800, in an embodiment, in the cloud-based system 100. Of note, it is likely that every data center for the cloud-based system 100 may not have a locally available HSM, so several regional hub Cloud HSMs 800-1, 800-2 will provide service to the enforcement nodes 150 in the nearby, geographically, data centers. Since the throughput expectation for first seen domains is not high, especially in steady state, a regional hub model with central locations (US-West, US-East, US-Central, EU-West, EU-Central, EU-South, APAC) will suffice to ensure low latency <25 ms for the first seen domains and ensure minimal UX impact.

Inserting an HSM into the data path, for providing digital signing services, fundamentally changes the distributed cloud architecture design, in which each enforcement node 150 instance acts as an independent processing entity, to a design in which each enforcement node 150 needs to make a round trip to the nearby HSM to get the signing services.

Rather than distributing the work as in the existing design, the main differences are that the enforcement node 150 will no longer act as an issuing CA, the short-lived CA layer is not needed, a new issuing CA service role will be introduced to make the enforcement node 150 agnostic of the preferred HSM form factor/model/interface, and provide a caching service.

§ 9.1 Process

Figure 24:
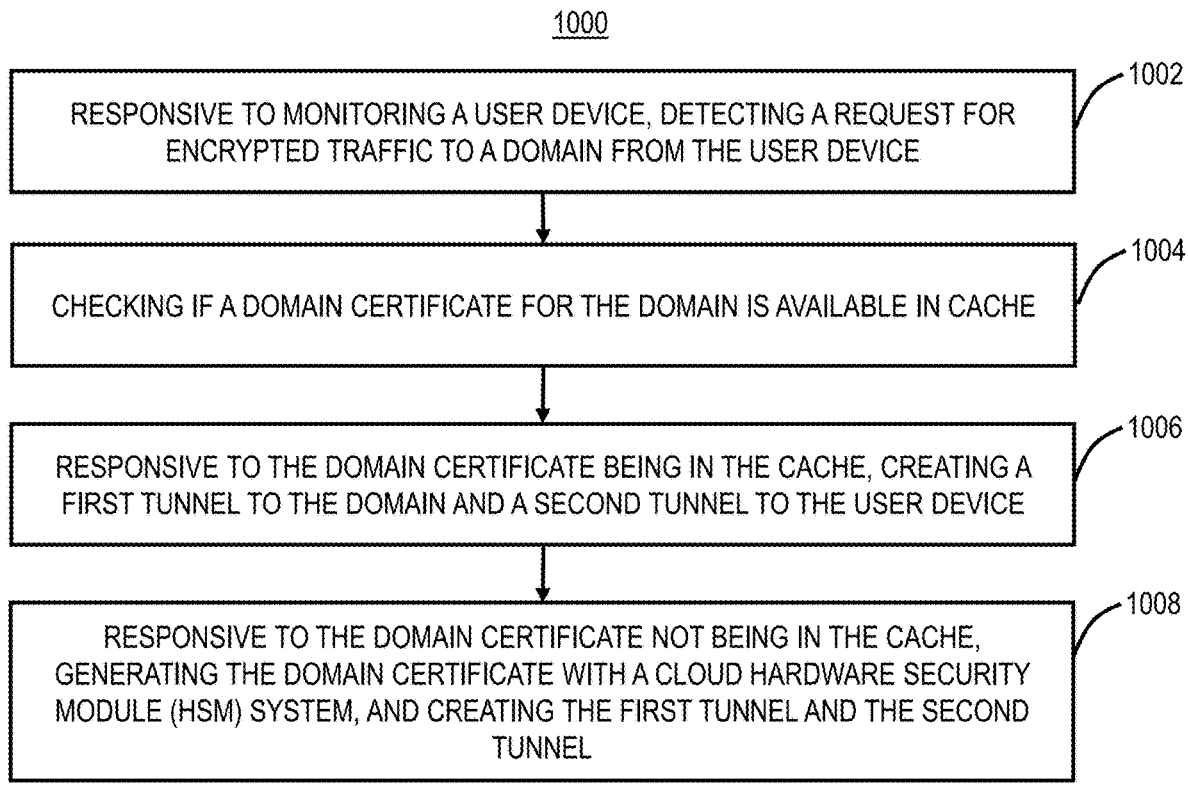
FIG. 24 is a flowchart of a process for man-in-the-middle inspection of encrypted traffic with cloud-based hardware security modules (HSM) with multi-tenant key infrastructure.

FIG. 24 is a flowchart of a process 1000 for man-in-the-middle inspection of encrypted traffic with cloud-based hardware security modules (HSM) with multi-tenant key infrastructure. The process 1000 contemplates implementation as a method, as a computer-readable code stored on a non-transitory computer-readable storage medium for programming the node 150, etc.

The process 1000 includes, responsive (1002) to monitoring a user device (300), detecting a request for encrypted traffic to a domain from the user device (300); checking (1004) if a domain certificate for the domain is available in cache; responsive (1006) to the domain certificate being in the cache, creating a first tunnel (610) to the domain and a second tunnel (612) to the user device; and, responsive (1008) to the domain certificate not being in the cache, generating the domain certificate with a cloud hardware security module (HSM) system (800), and creating the first tunnel (610) and the second tunnel (612).

The process (1000) includes, responsive to generating the domain certificate, caching the domain certificate and synchronizing with other nodes (150) in the cloud-based system (100). The process (1000) includes monitoring the encrypted traffic for one or more security functions. The process (1000) includes one of blocking or allowing the encrypted traffic based on the one or more security functions. The process (1000) includes prior to the detecting, enrolling the domain in the cloud HSM (800) with a customer certificate authority (870). A cleartext private key associated with the customer certificate authority is constrained to an HSM.

The generating includes generating a key pair and certificate signing request; requesting the cloud HSM (800) asymmetrically sign; receiving a digital signature from the cloud HSM (800); and merging the digital signature and a certificate. The cloud HSM (800) can be a separate cloud system from the cloud-based system (100). The cloud HSM (800) includes one or more key management systems (KMSs) (810) connected to one or more physical HSMs (820). The first tunnel (610) and the second tunnel (612) are created based on a plurality of certificates including a customer root certificate that resides in a customer HSM, customer intermediate certificates previously stored in the cloud HSM, and the domain certificates issued at runtime or from the cache.

§ 10.0 Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A method implemented by a node in a cloud-based system, the method comprising steps of:
    responsive to monitoring a user device, detecting a request for encrypted traffic to a domain from the user device;
    checking if a domain certificate for the domain is available in cache;
    responsive to the domain certificate being in the cache, creating a first tunnel to the domain and a second tunnel to the user device; and
    responsive to the domain certificate not being in the cache, generating the domain certificate in the cloud-based system, and creating the first tunnel and the second tunnel.

2. The method of claim 1, wherein the steps include
    responsive to generating the domain certificate, caching the domain certificate and synchronizing with other nodes in the cloud-based system.

3. The method of claim 1, wherein the steps include
    monitoring the encrypted traffic for one or more security functions.

4. The method of claim 3, wherein the steps include
    one of blocking or allowing the encrypted traffic based on the one or more security functions.

5. The method of claim 1, wherein the steps include
    prior to the detecting, enrolling the domain in the cloud HSM with a customer certificate authority.

6. The method of claim 5, wherein a cleartext private key associated with the customer certificate authority is constrained to a hardware security module (HSM).

7. The method of claim 1, wherein the generating includes
    generating a key pair and certificate signing request;
    requesting a cloud hardware security module (HSM) in or connected to the cloud-based system asymmetrically sign;
    receiving a digital signature from the cloud HSM; and
    merging the digital signature and a certificate.

8. The method of claim 1, wherein the first tunnel and the second tunnel are created based on a plurality of certificates including a customer root certificate that resides in a customer hardware security module (HSM), customer intermediate certificates previously stored in the cloud HSM, and the domain certificates issued at runtime or from the cache.

9. A non-transitory computer-readable medium comprising instructions executed by one or more nodes in a cloud-based system to perform steps of:
    responsive to monitoring a user device, detecting a request for encrypted traffic to a domain from the user device;
    checking if a domain certificate for the domain is available in cache;
    responsive to the domain certificate being in the cache, creating a first tunnel to the domain and a second tunnel to the user device; and
    responsive to the domain certificate not being in the cache, generating the domain certificate in the cloud-based system, and creating the first tunnel and the second tunnel.

10. The non-transitory computer-readable medium of claim 9, wherein the steps include
    responsive to generating the domain certificate, caching the domain certificate and synchronizing with other nodes in the cloud-based system.

11. The non-transitory computer-readable medium of claim 10, wherein the steps include one of blocking or allowing the encrypted traffic based on the one or more security functions.

12. The non-transitory computer-readable medium of claim 9, wherein the steps include monitoring the encrypted traffic for one or more security functions.

13. The non-transitory computer-readable medium of claim 12, wherein a cleartext private key associated with the customer certificate authority is constrained to a hardware security module (HSM).

14. The non-transitory computer-readable medium of claim 9, wherein the steps include prior to the detecting, enrolling the domain with a customer certificate authority.

15. The non-transitory computer-readable medium of claim 9, wherein the generating includes generating a key pair and certificate signing request;

requesting a cloud hardware security module (HSM) asymmetrically sign;

receiving a digital signature from the cloud HSM; and merging the digital signature and a certificate.

16. The non-transitory computer-readable medium of claim 9, wherein the first tunnel and the second tunnel are created based on a plurality of certificates including a customer root certificate that resides in a customer hardware security module (HSM), customer intermediate certificates previously stored in the cloud HSM, and the domain certificates issued at runtime or from the cache.

17. A node in a cloud-based system, the node comprising:
one or more processors and memory storing instructions that, when executed, cause the one or more processors to:
responsive to monitoring a user device, detect a request for encrypted traffic to a domain from the user device;
check if a domain certificate for the domain is available in cache;
responsive to the domain certificate being in the cache, create a first tunnel to the domain and a second tunnel to the user device; and
responsive to the domain certificate not being in the cache, generate the domain certificate in the cloud-based system, and create the first tunnel and the second tunnel.

18. The node of claim 17, wherein the instructions that, when executed, further cause the one or more processors to:
responsive to generating the domain certificate, cache the domain certificate and synchronizing with other nodes in the cloud-based system.

19. The node of claim 17, wherein the instructions that, when executed, further cause the one or more processors to:
monitor the encrypted traffic for one or more security functions.

20. The node of claim 19, wherein the instructions that, when executed, further cause the one or more processors to:
one of block or allow the encrypted traffic based on the one or more security functions.

* * * * *